(12) United States Patent
Cho

(10) Patent No.: US 9,374,668 B2
(45) Date of Patent: Jun. 21, 2016

(54) METHOD OF PROCESSING MULTIMEDIA AND ELECTRONIC DEVICE THEREOF

(71) Applicant: Samsung Electronics Co., Ltd., Gyeonggi-do (KR)

(72) Inventor: Sung-Jae Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/658,776

(22) Filed: Mar. 16, 2015

(65) Prior Publication Data

US 2015/0264529 A1    Sep. 17, 2015

(30) Foreign Application Priority Data

Mar. 14, 2014  (KR) .......................... 10-2014-0030309

(51) Int. Cl.
| | |
|---|---|
| *H04W 24/00* | (2009.01) |
| *H04W 4/02* | (2009.01) |
| *H04M 1/03* | (2006.01) |
| *G01S 5/18* | (2006.01) |
| *G01S 3/803* | (2006.01) |

(52) U.S. Cl.
CPC .............. *H04W 4/023* (2013.01); *G01S 3/803* (2013.01); *G01S 5/18* (2013.01); *H04M 1/03* (2013.01); *H04W 4/025* (2013.01)

(58) Field of Classification Search
CPC ........ H04W 4/023; H04W 4/025; G01S 5/18; H04M 1/03

USPC ............ 455/456.6, 456.2, 456.3, 46.6, 456.1, 455/414.1, 41.3, 567, 570, 556.1
See application file for complete search history.

(56) References Cited

U.S. PATENT DOCUMENTS

| | | | | |
|---|---|---|---|---|
| 6,457,177 | B1 * | 9/2002 | Reams | H04H 20/38 348/E7.069 |
| 8,868,028 | B1 * | 10/2014 | Kaltsukis | H04W 4/028 455/404.1 |
| 2012/0128160 | A1 * | 5/2012 | Kim | G11B 20/00 381/17 |
| 2012/0263020 | A1 * | 10/2012 | Taylor | G01S 5/18 367/124 |
| 2013/0142349 | A1 | 6/2013 | Liu et al. | |
| 2015/0245133 | A1 * | 8/2015 | Kim | H04R 1/326 381/92 |

* cited by examiner

*Primary Examiner* — Dhaval Patel
(74) *Attorney, Agent, or Firm* — The Farrell Law Firm, P.C.

(57) ABSTRACT

A method of and electronic device for processing multimedia of an electronic device is provided. The method includes determining location information relative to another electronic device based on audio input from the another electronic device in a mode of sharing the multimedia, and controlling an output method of the multimedia based on the location information relative to the another electronic device. The electronic device includes a memory configured to store at least one input audio, at least one microphone configured to input the input audio, and at least one processor configured to enter a mode of sharing the multimedia and determine location information relative to at least one another electronic device based on audio input from the another electronic device and control an output method of the multimedia based on the relative location information.

18 Claims, 14 Drawing Sheets

METHOD OF PROCESSING MULTIMEDIA AND ELECTRONIC DEVICE THEREOF

PRIORITY

This application claims priority under 35 U.S.C. §119(a) to a Korean Patent Application filed on Mar. 14, 2014 in the Korean Intellectual Property Office and assigned Serial No. 10-2014-0030309, the entire contents of which are incorporated herein by reference.

BACKGROUND

1. Field of the Invention

The present invention relates generally to a method of processing multimedia of an electronic device and an electronic device thereof, and more particularly, to a method of processing multimedia of an electronic device by determining location information relative to another electronic device based on audio input from the another electronic device in a mode of sharing the multimedia, and controlling an output method of the multimedia based on the location information relative to the another electronic device.

2. Description of the Related Art

In general, various types of electronic devices such as a smart phone or a tablet Personal Computer (PC) may include a Touch Screen Panel (TSP) for a display and to have at least one microphone and speaker. An electronic device may have at least two speakers, and at least two electronic devices may output audio by interlocking.

In an operation of an electronic device, when outputting an image through displays included in at least two electronic devices by interlocking the at least two electronic devices, a display having a size two times greater than that of one electronic device may provide a designated image. Further, when processing to separate and output channels of audio of two channels or more, at least two interlocked electronic devices may separate and output a channel relatively more clearly than an output through a speaker included in one electronic device.

In the conventional art, when simultaneously outputting one audio data through at least two designated electronic devices, it is necessary to interlock two electronic devices to operate like one electronic device. When setting the at least two electronic devices to operate like one electronic device, a method of manually selecting a location at which respective electronic devices are arranged or sequentially setting at least one interlocking, electronic device in a first electronic device to operate like one electronic device is requested, and this may deteriorate utility.

SUMMARY

The present invention has been made to address at least the above-mentioned problems and/or disadvantages, and to provide at least the advantages described below. Accordingly, an aspect of the present invention is to provide a method of processing multimedia of an electronic device and an electronic device thereof.

In accordance with an aspect of the present invention, a method of processing multimedia of an electronic device is provided. The method includes determining location information relative to another electronic device based on audio input from the another electronic device in a mode of sharing the multimedia, and controlling an output method of the multimedia based on the location information relative to the another electronic device.

In accordance with another aspect of the present invention, art electronic device is provided. The electronic device includes a memory configured to store at least one input audio, at least one microphone configured to input the at least one input audio; and at least one processor configured to enter a mode of sharing multimedia and determine location information relative to at least one another electronic device based on the at least one input audio input from the at least one another electronic device and control an output method of the multimedia based on the location information of the at least one another electronic device.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
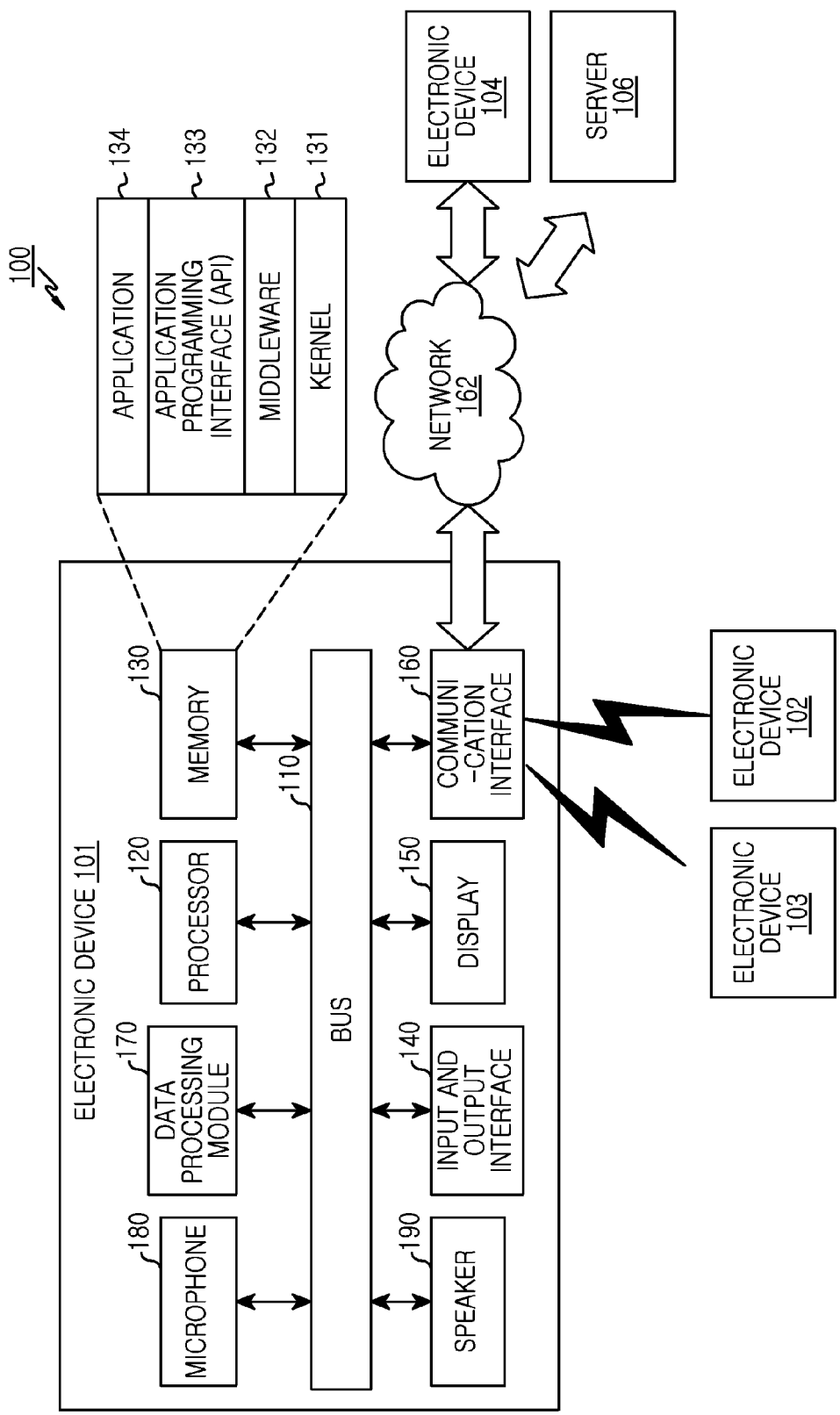
FIG. 1 is a block diagram illustrating a network environment including an electronic device according to an embodiment of the present invention.

Hereinafter, embodiments of the present invention are described in detail with reference to the accompanying drawings. While the present invention may be embodied in many different forms, embodiments of the present invention are shown in the accompanying drawings and are described herein in detail, with the understanding that the present invention is to be considered as an exemplification of the principles of the invention and is not intended to limit the invention to an embodiment illustrated. The same reference numbers are used throughout the drawings to refer to the same or like parts.

The expressions "comprising" or "may comprise" used in an embodiment of the present invention indicates the presence of a corresponding function, operation, or element and does not limit an additional at least one function, operation, or element. Further, in an embodiment of the present invention, the terms "comprise" or "have" indicate the presence of a characteristic, numeral, step, operation, element, component, or combination thereof described in a specification and does not exclude the presence or addition of at least one other characteristic, numeral, step, operation, element, component, or combination thereof.

In an embodiment of the present invention, the expression "or" includes any combination and an entire combination of together listed words. For example, "A or B" may include A, B, or A and B.

Expressions such as "first," "second," "primary," or "secondary" used in an embodiment of the present invention may represent various elements of the present invention and do not limit the order and/or importance of corresponding elements. The expressions may be used for distinguishing one element from another element. For example, both a first user device and a second user device are user devices and represent different user devices. For example, a first element may be referred to as a second element without deviating from the scope of the present invention, and similarly, a second element may be referred to as a first element.

When it is described that an element is "connected" or "electrically connected" to another element, the element may be "directly connected" or "directly electrically connected" to the other element or may be "connected" or "electrically connected" to the other element through a third element. However, when it is described that an element is "directly connected" or "directly electrically connected" to another element, no element may exist between the element and the other element.

Further, a term used in an embodiment of the present invention is used for describing the embodiment, but does not limit the present invention. When used in a description of the present invention and the appended claims, a singular expression includes plural expressions unless it is explicitly differently represented.

Unless differently defined, a term including a technical term and a scientific term used here has the same meaning as a meaning that may be generally understood by a person of ordinary skill in the art. It should be interpreted that a term defined in a dictionary has a meaning corresponding to that of a context of related technology and is not to be interpreted as having an ideal or excessively formal meaning unless explicitly defined.

An electronic device according to an embodiment of the present invention may be a device including a communication function. For example, the electronic device may include at least one of a smart phone, a tablet PC, a mobile phone, a video phone, an e-book reader, a desktop PC, a laptop PC, a netbook computer, a Personal Digital Assistant (FDA), a Moving Picture Experts Group Audio Layer 3 (MP3) player, a mobile medical device, a camera, or a wearable device (e.g., a Head Mounted Display (HMD) such as electronic glasses, electronic clothing, an electronic bracelet, an electronic necklace, electronic accessory, electronic tattoo, or a smart watch).

According to an embodiment of the present invention, an electronic device may be a smart home appliance having a communication function. The smart home appliance may include at least one of, for example, a television, a Digital Versatile Disc (DVD) player, an audio device, a refrigerator, an air-conditioner, a vacuum cleaner, an oven, a microwave oven, a washing machine, an air cleaner, a set-top box, a television box (e.g., Samsung HomeSync™, AppleTV™, or Google TV™), game consoles, an electronic dictionary, an electronic key, a camcorder, or an electronic frame.

According to an embodiment of the present invention, an electronic device may include at least one of various medical devices (e.g., a Magnetic Resonance Angiography (MRA) device, a Magnetic Resonance Imaging (MRI) device, a Computed Tomography (CT) device, a scanning machine, and an ultrasonic wave device), a navigation device, a Global Positioning System (GPS) receiver, an Event Data Recorder (EDR), a Flight Data Recorder (FDR), vehicle infotainment device, an electronic equipment for a ship (e.g., a navigation device for a ship and a gyro compass), avionics, a security device, a head unit for a vehicle, an industrial or home robot, an Automated Teller Machine (ATM) of a financial institution, or a Point Of Sale (POS) device of a store or vendor.

According to an embodiment of the present invention, an electronic device may include at least one of a portion of furniture or a building/structure, an electronic board, an electronic signature input device, a projector, or various measuring devices (e.g., water supply, electricity, gas, or electrical wave measuring device) including a communication function. An electronic device according to an embodiment of the present invention may be at least one combination of the foregoing various devices. Further, an electronic device according to an embodiment of the present invention may be a flexible device. Further, it will be apparent to a person of ordinary skill in the art that an electronic device according to an embodiment of the present invention is not limited to the foregoing devices.

Hereinafter, an electronic device according to an embodiment of the present invention is described with reference to the accompanying drawings. A term referring to a user in an embodiment of the present invention may indicate a person using an electronic device or a device (e.g., an artificial intelligence electronic device) using the electronic device.

FIG. 1 is a block diagram illustrating a network environment 100 including an electronic device 101 according to an embodiment of the present invention.

Referring to FIG. 1, the electronic device 101 includes a bus 110, a processor 120, a memory 130, an input and output interface 140, a display 150, a communication interface 160, a data processing module 170, a microphone 180, and a speaker 190.

The bus 110 is a circuit that connects the foregoing elements and transfers a communication signal (e.g., a control message) between the foregoing elements.

The processor 120 receives an instruction from the foregoing other elements (e.g., the memory 130, the input and output interface 140, the display 150, the communication interface 160, the data processing module 170, the microphone 180, or the speaker 190) through, for example, the bus 110, decodes the received instruction, and performs an operation and data processing according to the decoded instruction.

The memory 130 stores an instruction or data received from the processor 120 or other elements (e.g., the input and output interface 140, the display 150, the communication interface 160, the data processing module 170, the microphone 180, or the speaker 190) or generated by the processor 120 or other elements. The memory 130 includes, for example, programming modules such as a kernel 131, middleware 132, an Application Programming Interface (API) 133, or an application 134. The foregoing respective programming modules may be formed with software, firmware, hardware, or a combination of at least two thereof.

The kernel 131 controls or manages a system resource (e.g., the bus 110, the processor 120, or the memory 130) used for executing an operation or a function implemented in the remaining programming modules, for example, the middleware 132, the API 133, or the application 134. Further, the kernel 131 provides an interface that can enable the middleware 132, the API 133, or the application 134 to access an individual element of the electronic device 101 and to control or manage the individual element.

The middleware 132 performs an intermediary function of enabling the API 133 or the application 134 to communicate with the kernel 131 to provide and receive data. Further, the middleware 132 controls (e.g., schedules or load balances) a work request received from the application 134 using, for example, a method of assigning a priority for using a system resource (e.g., the bus 110, the processor 120, or the memory 130) of the electronic device 101 to at least one of the applications 134.

The API 133 is an interface that enables the application 134 to control a function in which the kernel 131 or the middleware 132 provides and may include, for example, at least one interface or function (e.g., instruction) for file control, window control, image processing, or text control.

According to an embodiment of the present invention, the application 134 may include a Short Message Service (SMS)/Multimedia Messaging Service (MMS) application, an e-mail application, a calendar application, an alarm application, a health care application (e.g., an application that measures an amount of exercise or a blood sugar level), or an environmental information application (e.g., an application that provides atmospheric pressure, humidity, or temperature information). Additionally or alternatively, the application 134 may be an application related to information exchange between the electronic device 101 and an external electronic device 104. An application related to information exchange may include, for example, a notification transfer application for transferring information to the external electronic device or a device management application for managing the external electronic device.

For example, the notification transfer application may include a function of transmitting notification information that has occurred in other applications (e.g., an SMS/MMS application, an e-mail application, a health care application, or environmental information application) of the electronic device 101 to an external electronic device 104. Additionally or alternatively, a notification transfer application may receive notification information from, for example, an external electronic device 104 and provide the notification information to a user. A device management application may perform, for example, the turn-on/turn-off of a function (e.g., art external electronic device (or some components)) of at least a portion of an external electronic device 104 that communicates with the electronic device 101, brightness (or resolution) adjustment of a display, or management (e.g., installation, deletion, or update) of an application operating in an external electronic device or a service (e.g., a communication service or a message service) provided in an external electronic device.

According to an embodiment of the present invention, the application 134 may include an application designated according to an attribute (e.g., a type of an electronic device) of an external electronic device 104. For example, when the external electronic device is an MP3 player, the application 134 may include an application related to music reproduction. Similarly, when the external electronic device is a mobile medical device, the application 134 may include an application related to health care. According to an embodiment of the present invention, the application 134 may include at least one of an application designated to the electronic device 101 or an application received from an external electronic device (e.g., a server 106 or the electronic device 104).

The input and output interface 140 transfers an instruction or data input by a user through a sensor (e.g., an acceleration sensor, a gyro sensor) or an input device (e.g., a keyboard, a touch screen) to the processor 120, the memory 130, the communication interface 160, the data processing module 170, the microphone 180, or the speaker 190 through, for example, the bus 110. For example, the input and output interface 140 may provide data about a user touch input through a touch screen to the processor 120. Further, the input and output interface 140 may output an instruction or data received from the processor 120, the memory 130, the communication interface 160, or the data processing module 170, the microphone 180, or the speaker 190 through, for example, the bus 110, through the output device (e.g., a speaker or a display). For example, the input and output interface 140 may output sound data processed through the processor 120 to the user through a speaker.

The display 150 displays various information (e.g., multimedia data or text data) to the user. The display 150 may be formed in a touch screen that inputs an instruction by touching or proximity touching an input means in a display.

The communication interface 160 establishes communication between the electronic device 101 and an external device (e.g., the electronic device 104 or the server 106). For example, the communication interface 160 may be connected to a network 162 through wireless communication or wire communication to communicate with the external device. The wireless communication may include at least one of, for example, Wireless Fidelity (WiFi), Bluetooth (BT), Near Field Communication (NFC), Global Positioning System (GPS), or cellular communication (e.g., Long Term Evolution (LTE), LTE Advanced (LTE-A), Code Division Multiple Access (CDMA), Wideband CDMA (WCDMA). Universal Mobile Telephone System (UMTS), Wireless Broadband Internet (WiBro) or Global System for Mobile (GSM)). The wire communication may include at least one of for example, a universal Serial Bus (USB), a High Definition Multimedia Interface (HDMI), Recommended Standard (RS)-232, or a Plain Old Telephone Service (POTS).

According to an embodiment of the present invention, the network 162 may be a communication network. The communication network may include at least one of a computer network, the Internet, the Internet of Things (IoT), or a phone network. According to an embodiment of the present invention, a protocol (e.g., a transport layer protocol, a data link layer protocol, or a physical layer protocol) for communication between the electronic device 101 and an external device may be supported in at least one of the application 134, the API 133, the middleware 132, the kernel 131, or the communication interface 160. According to an embodiment of the present invention, a protocol (e.g., a short range communication protocol, a network communication protocol, or a wire communication protocol) for communication between the electronic device 101 and an external device may be supported in at least one of the API 133 or the middleware 132. Electronic devices 102, 103, and 104 each may be the same device (e.g., the same type) as the electronic device 101 or may be devices different (e.g., a different type) from the electronic device 101.

The data processing module 170 processes at least a portion of information acquired from other elements (e.g., the processor 120, the memory 130, the input and output interface 140, or the communication interface 160) and provides the portion to a user with various methods. For example, the data processing module 170 may control at least a partial function of the electronic device 101 so that the electronic device 101 interlocks with another electronic device (e.g., the electronic device 102, the electronic device 103, the electronic device 104, or the server 106) using the processor 120 or independently of the processor 120.

The data processing module 170 divides and outputs designated data of the electronic device 101 to at least two displays and/or speakers included in at least two electronic devices through a sharing mode. The divided and output designated data may be controlled in the electronic device 101 like outputting from one display and a speaker formed in one electronic device through at least two displays and/or at least two speakers included in at least two electronic devices. In the following description, at least two displays are described as a display included in each of separated electronic devices like the display 150 of the first electronic device 101 and the display 250 of the second electronic device 102, but are not limited thereto and may be a display included in one electronic device like at least two displays included in the first electronic device 101.

In this case, the electronic device 101 may be connected to at least one electronic device by a network communication to share designated multimedia with the designated second electronic device 102. When the electronic device 101 shares designated multimedia with the second electronic device 102, the data processing module 170 divides (e.g., divides one multimedia into at least two channels) multimedia with a designated method, and each electronic device (e.g., the first electronic device 101 and the second electronic device 102) outputs the multimedia to correspond to synchronization, where outputting the multimedia may be performed in real time with sharing of multimedia. Hereinafter, as described above, the electronic device 101 may share multimedia with the second electronic device 102 functionally connected (e.g., connected by network communication) and may define a function that can output sharing multimedia data to a sharing mode. The electronic device 101 may divide a video or an image into at least two channels and display the video or the image in at least two displays without limiting a sharing mode to audio.

The data processing module 170 may include a memory that stores at least one input audio, at least one microphone that inputs the input audio, and at least one processor that enters a mode of sharing the multimedia and determines location information relative to another electronic device from at least one other electronic device based on the input audio and controls an output method of the multimedia based on the relative location information.

According to an embodiment of the present invention, the above-described audio may be a signal formed with a frequency and an amplitude. Audio may be divided into a voice signal and a sound signal, and a signal constituting audio may be formed with a component of a frequency and an amplitude.

The data processing module 170 processes an audio input to at least two microphones mounted in the electronic device. In order to determine an output direction of the input audio, the data processing module 170 determines the output direction of audio input to at least two microphones mounted apart a designated distance or more. The data processing module 170 compares audio input to at least two microphones included in the electronic device and determines the relative location information. The data processing module 170 compares at least one of a volume difference of each audio input to at least two microphones included in the electronic device, a phase difference at a designated segment, and a time difference in which an input of the audio is started and determines the relative location information. The data processing module 170 separates the multimedia into at least two channels and enables another electronic device to output at least one channel. The data processing module 170 includes at least one of image data, video data, and audio data in the multimedia. The data processing module 170 calls a designated program based on an instruction included in the input audio. The data processing module 170 selects and executes at least one of at least two menus in which a designated program provides based on at least one of the determined relative location information and the instruction. The data processing module 170 may include a signal of a designated frequency band in a mode of sharing the multimedia in an audio output. The data processing module 170 may include the relative location information in an audio output. The data processing module 170 may include at least one instruction of the electronic device in an audio output. The data processing module 170 may include an instruction requesting a connection to another electronic device by designated network communication in an audio output. The data processing module 170 determines information about a direction in which another electronic device is located to relative location information based on a location of an electronic device. The data processing module 170 may extract device identification information of another electronic device from input audio and identify the electronic device that outputs the input audio. The data processing module 170 compares data of audio input to at least two microphones included in the electronic device and determines relative location information. The data processing module 170 compares at least one of a volume difference and a phase difference of each audio input to at least two microphones included in the electronic device and a time difference in which an input is started and determines relative location information. The data processing module 170 separates multimedia into at least two channels and enables another electronic device to output at least one channel. The data processing module 170 determines contents of multimedia outputting from another electronic device based on relative location information and enables another electronic device to output contents. The data processing module 170 may include and output relative location information in audio of multimedia. The data processing module 170 may output relative location information with a frequency signal of audio of multimedia. The data processing module 170 may include and output control information for controlling another electronic device in audio of multimedia.

The data processing module 170 may be operated by at least one processor 120 or the data processing module 170 may operate based on the control of the processor 120. Additional information of the data processing module 170 is provided below with reference to FIGS. 2 to 10.

The microphone 180 is included at a designated location of the electronic device 101 to input audio externally from the electronic device 101. The microphone 180 may be a directional microphone that can detect audio input to a designated direction or determine a direction in which audio is input. A microphone 180 may be included in two or more designated locations of the electronic device 101, where each microphone 180 acquires audio input from external to the electronic device 101, and where each microphone 180 determines an output direction of audio by comparing an audio difference of the same source 111 input to each microphone 180. When determining an output direction of audio input through at least two microphones 180 included in the electronic device 101, at least two microphones 180 are separated by a designated distance or more. The microphone 180 mounted in the electronic device 101 may include at least one directional microphone or nondirectional microphone (e.g., a common microphone).

The speaker 190 is included at a designated location of the electronic device 101 to output audio of audio data included in the electronic device 101. When at least one instruction to transmit audio from the electronic device 101 to another electronic device is included, the speaker 190 outputs audio in which a corresponding instruction is included.

Figure 2:
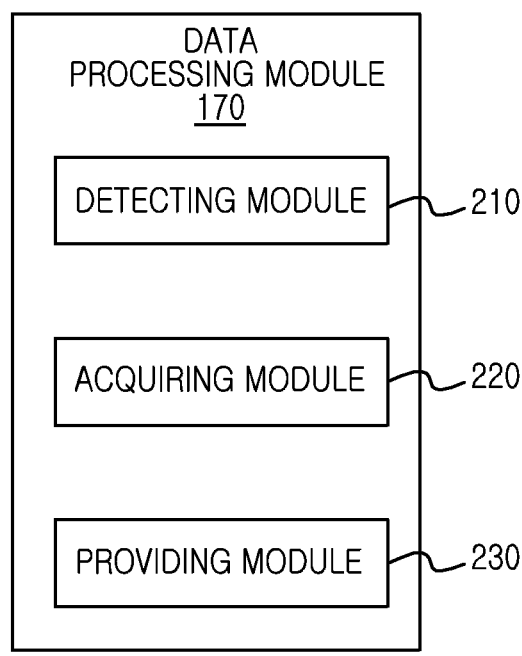
FIG. 2 is a block diagram illustrating a data processing module of an electronic device according to an embodiment of the present invention.

FIG. 2 is a block diagram illustrating a data processing module 170 of an electronic device (e.g., an electronic device 101) according to an embodiment of the present invention.

Referring to FIG. 2, the data processing module 170 includes at least one of a detecting module 210, an acquiring module 220, and a providing module 230.

The detecting module 210 detects that the electronic device 101 is in a sharing mode state of outputting designated data like one electronic device by interlocking with at least one other electronic device (e.g., the second electronic device 102 or the third electronic device 103).

The acquiring module 220 acquires audio including at least information in which the second electronic device 102 outputs through at least two microphones 180 included in a designated location of the electronic device 101. In this case, information included in the second electronic device 102 may include at least one of identification information (e.g. device identification information) and relative location information (e.g., relative location information of the first electronic device 101 determined based on audio output from the first electronic device 101) of the second electronic device 102. The acquiring module 220 compares a difference of audio input to at least two microphones 180 included in the electronic device 101 and acquire information about a direction of the second electronic device 102 that outputs audio.

The providing module 230 changes a function provided in the second electronic device 102 according to relative location information of the second electronic device 102 that outputs audio based on a location of the electronic device 101. When the electronic device 101 and the second electronic device 102 operate in a sharing mode state of outputting designated data by interlocking like one electronic device, the providing module 230 outputs a division of data of designated data to correspond to relative location information of the electronic device 101 and the second electronic device 102.

Figure 3:
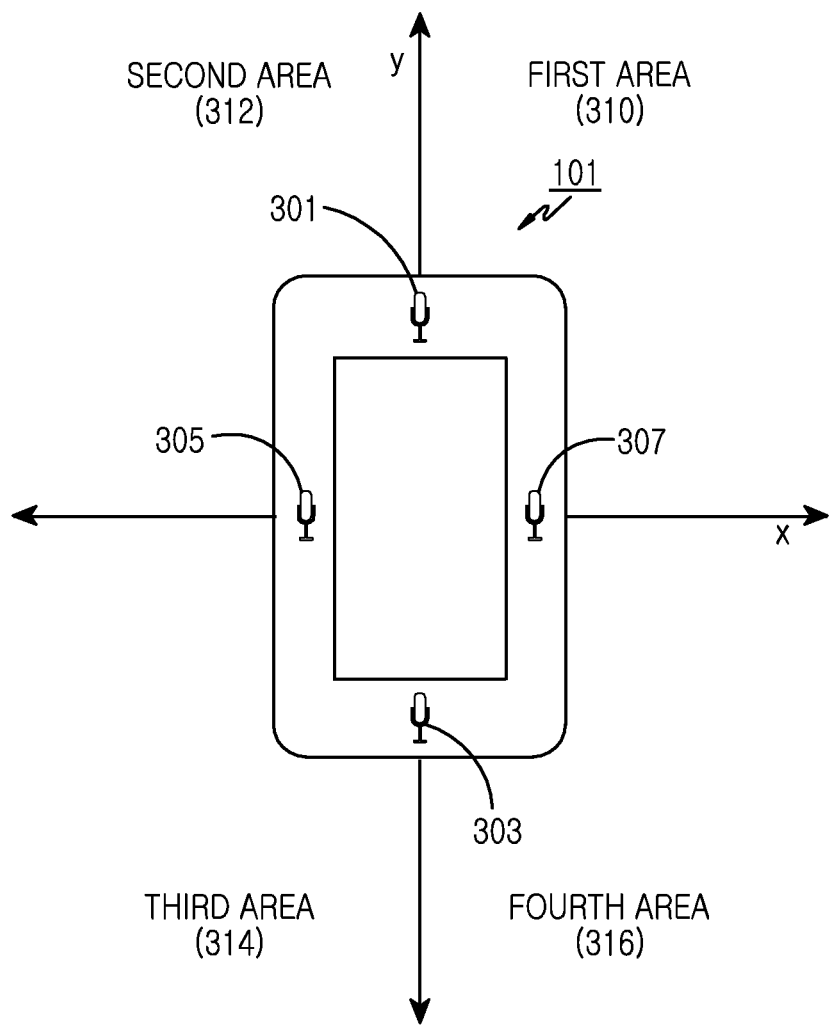
FIG. 3 is a diagram illustrating a reference of determining location information relative to another electronic device in an electronic device according to an embodiment of the present invention.

FIG. 3 is a diagram illustrating a reference of determining location information relative to another electronic device in an electronic device 101 according to an embodiment of the present invention.

The electronic device 101 includes at least one microphone 180 at a designated location internal or external to the electronic device 101. The electronic device 101 determines an output direction of audio based on a location of the electronic device 101 that receives audio through a difference of a case in which a component constituting audio such as a time difference in which the same audio is input to the microphone 180 of one designated location, an amplitude (e.g., volume) difference of an audio signal, and a phase difference of a frequency constituting a designated segment of audio input to each microphone 180.

Referring to FIG. 3, the electronic device 101 includes a microphone at a designated location (e.g., at least one designated location of an upper side, a lower side, a left side, a right side, a front surface, and a rear surface) internal or external to the electronic device 101. For example, at a designated location internal to the electronic device 101, the electronic device 101 includes a first microphone 301, a second microphone 303, a third microphone 305, and a fourth microphone 307. When detecting audio output in a second area 312, the electronic device 101 compares components of audio input through the first microphone 301, the second microphone 303, the third microphone 305, and the fourth microphone 307. When a volume of audio input to the first microphone 301 and the third microphone 305 is relatively greater than that of audio input to the second microphone 303 and the fourth microphone 307, the electronic device 101 determines the audio to be audio output at a designated location of the second area 312. Alternatively, when a time point in which audio is input to the first microphone 301 and the third microphone 305 is relatively faster than a time point in which audio is input to the second microphone 303 and the fourth microphone 307, the electronic device 101 determines the audio to be audio output at a designated location of the second area 312. Alternatively, the electronic device 101 may compare phase information of a frequency constituting a designated segment of audio input to respective microphones of a designated frequency and determine a designated location of the second area 312 in which audio is output. When determining a designated location in which audio input to at least one microphone 180 of the electronic device 101 is output, if a virtual coordinate (e.g., a virtual space coordinate set based on the first electronic device 101) of a peripheral area of the electronic device 101 is designated to the electronic device 101, the electronic device 101 determines the virtual coordinate to a coordinate of a location in which audio is output. In audio output to the second area 312, the electronic device 101 may determine that a volume of audio input to the first microphone 301 and the third microphone 305 is relatively greater than that of audio input to the second microphone 303 and the fourth microphone 307.

According to another embodiment of the present invention, the electronic device 101 determines a direction of audio input with the above-described method through microphones of at least two designated locations at which the first microphone 301 and the second microphone 303 are located or at which the first microphone 301 and the fourth microphone 307 are located. The electronic device 101 determines relative location information such as a direction coordinate in which input audio is output through at least two microphones included in the electronic device 101 in a state separated by a designated distance or more like two microphones, three microphones, and four microphones without being limited to four microphones of FIG. 3 or two microphones of a designated location, as described above.

Figure 4A:
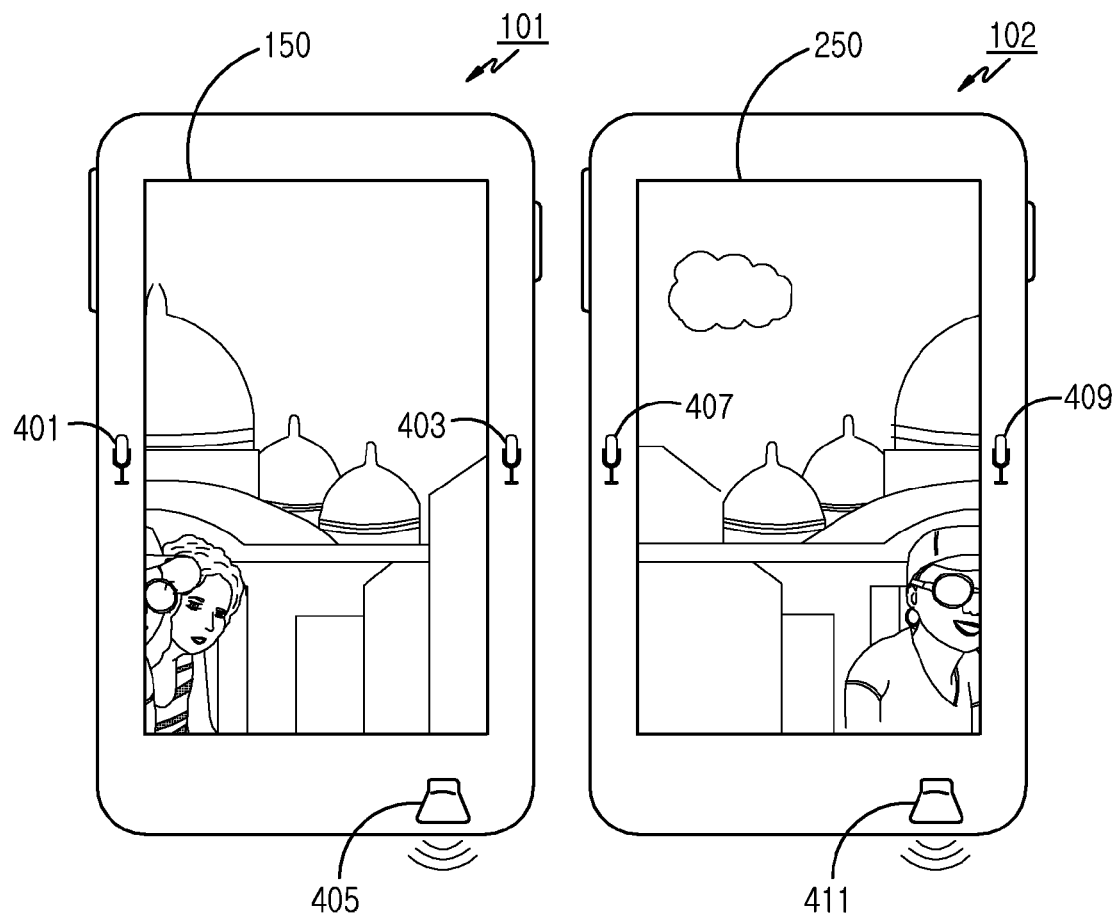
FIGS. 4A to 4C are diagrams illustrating an operation of displaying image information or outputting audio in an electronic device according to an embodiment of the present invention.
Figure 4B:
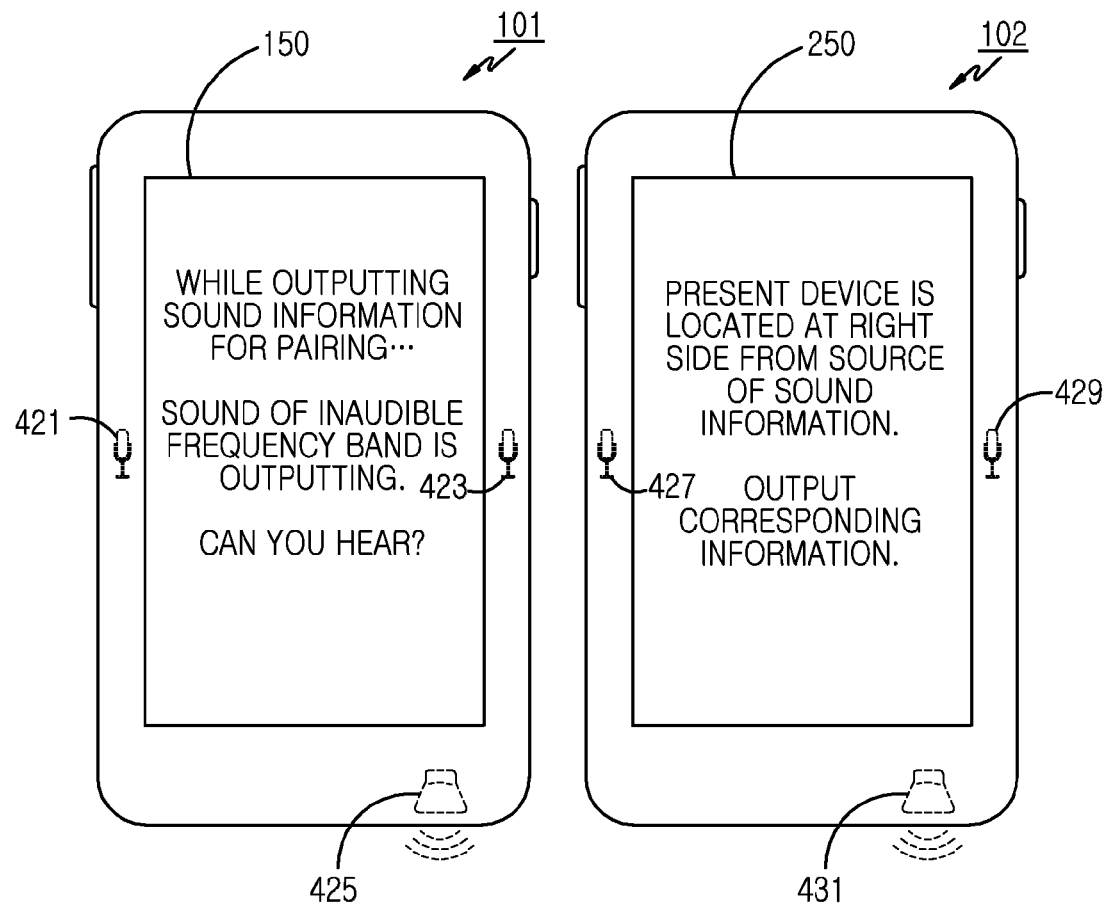
Figure 4C:
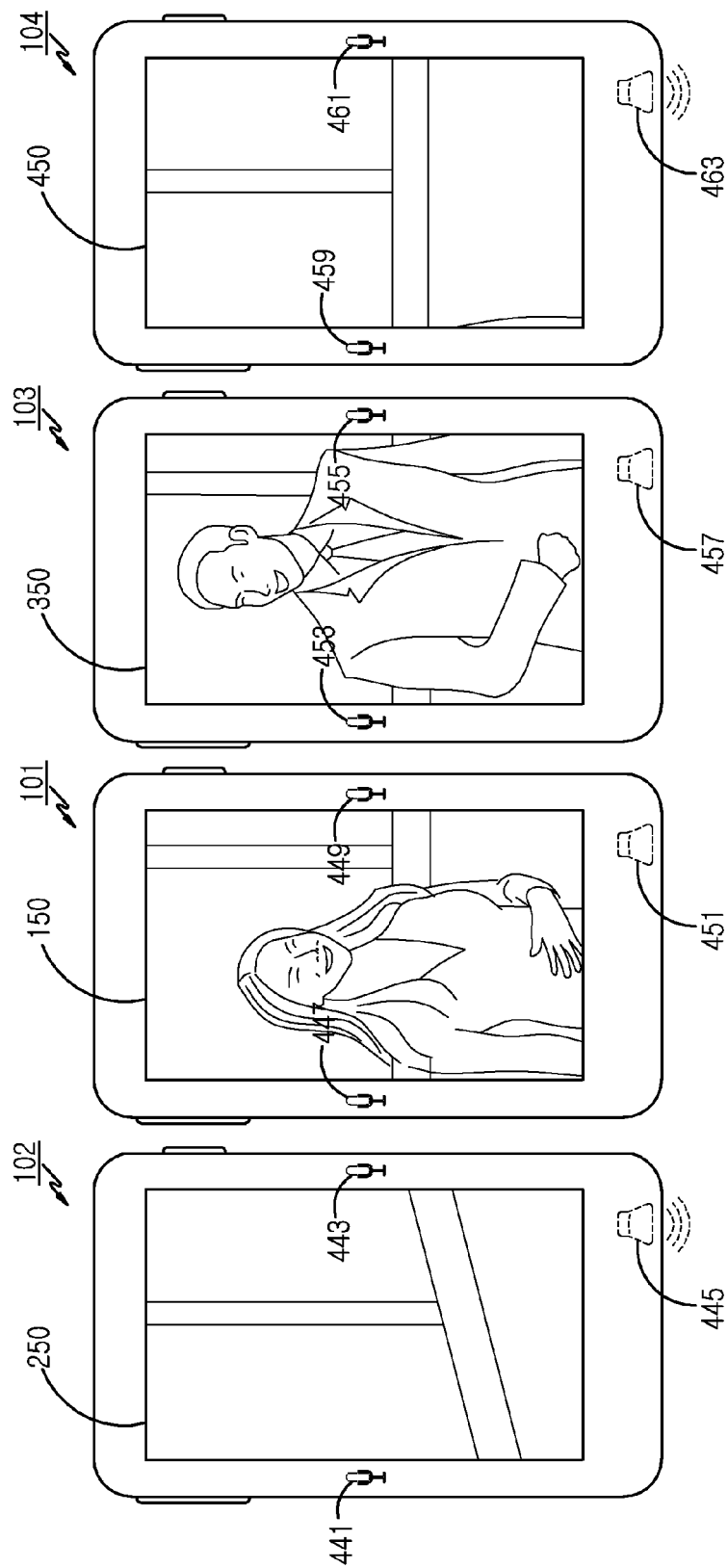

FIGS. 4A to 4C are diagrams illustrating operation of displaying image information or outputting audio in an electronic device 101 according to an embodiment of the present invention.

When the first electronic device 101 divides and outputs the same designated data with another electronic device (e.g., the second electronic device 102) connected by network communication, the first electronic device 101 displays image information about a designated portion in the display 150 or outputs audio of a designated portion to the speaker 190.

An embodiment of the present invention is described below with reference to FIG. 4A.

The first electronic device 101 operates in a sharing mode that displays designated data including audio and image information in a display of the first electronic device 101 and the second electronic device 102 or that outputs (in the following description, unless particularly defined, art operation of displaying in a display may be represented as an output together with an operation of outputting to a speaker) the designated data to a speaker thereof. In sharing mode, the electronic device 101 determines image information for two images (e.g., a left side image and a right side image) so that the display 150 of the first electronic device 101 and the display 250 of the second electronic device 102 display image information and determines audio for audio of two channels (e.g., a left side audio and a right side audio) so that a speaker 405 of the first electronic device 101 and a speaker 411 of the second electronic device 102 output audio. The electronic device 101 determines two images and audio of two channels to a first division of data outputting from the first electronic device 101 and a second division of data outputting from the second electronic device 102.

In order for the first electronic device 101 to output a first division of data and the second electronic device 102 to output a second division of data like outputting data from one electronic device, the first electronic device 101 determines a relative location of the first electronic device 101 and the second electronic device 102. According to an embodiment of the present invention, when executing designated data, the electronic device 101 transmits the second division of data to the second electronic device 102 so that the first electronic device 101 outputs the second division of data including a right side image and a right side audio and the second electronic device 102 outputs the first division of data including a left side image and a left side audio. The first electronic device 101 inputs the left side audio of the first division of data output from the speaker 411 of the second electronic device 102 to a first microphone 401 included at a designated location of the left side of the first electronic device 101 and a second microphone 403 included at a designated location of the right side of the first electronic device 101. The first electronic device 101 determines that the second electronic device 102, having output audio of the first division of data is located at the right side of the first electronic device 101 through audio of the first division of data acquired from the first microphone 401 and the second microphone 403. The first electronic device 101 transmits the second division of data to the second electronic device 102 so as to output the first division of data from the first electronic device 101 and to output the second division of data from the second electronic device 102. The first electronic device 101 includes and transmits setting information for outputting the first division of data and the second division of data like one data like a volume setting when outputting from the second electronic device 102 at a designated location of audio transmitting to the second electronic device 102 and synchronization information with first division data outputting from the first electronic device 101. A method of including at least one designated setting information in audio may be applied to an audio communication technique such as "audio Orthogonal Frequency Division Multiplexing (OFDM)." Further, in the electronic device 101, data (or information) that can be included in audio (e.g., audio to which an audio communication technique is applied) outputting or receiving by applying an audio communication technique is not limited to the above-described setting information and may include various data of a form that can be processed in an electronic device, such as control information (e.g., may be expressed with a term like a command or an instruction in an embodiment of the present invention) requesting to perform a designated function in at least one other electronic device that receives audio, identification information of an electronic device (e.g., the first electronic device 101) outputting audio, or data formed with a text.

According to another embodiment of the present invention, the first electronic device 101 receives feedback information about audio output from the first electronic device 101 from the second electronic device 102 and determines relative location information of the first electronic device 101 and the second electronic device 102 through the received feedback information. For example, the second electronic device 102 inputs audio of the second division of data output from the speaker 405 of the first electronic device 101 to a third microphone 407 included at a designated location of the left side of the second electronic device 102 and a fourth microphone 409 included at a designated location of the right side of the second electronic device 102. The second electronic device 102 determines that the first electronic device 101, having output audio of the second division of data through audio of the second division of data acquired through the third microphone 407 and the fourth microphone 409 is located at the left side of the second electronic device 102. The second electronic device 102 transmits relative location information of the second electronic device 102 determined based on the first electronic device 101 to the first electronic device 101. The electronic device 101 outputs the first division of data from the first electronic device 101 with reference to location information of the second electronic device 102 received from the second electronic device 102 and transmits second division data to the second electronic device 102 so as to output the second division of data from the second electronic device 102.

An embodiment of the present invention is described below with reference to FIG. 4B.

When the first electronic device 101 is connected to the designated second electronic device 102 by network communication, the first electronic device 101 performs a designated sharing mode. The first electronic device 101 outputs audio including a code (e.g., an instruction or control information) requesting to perform a designated function and/or identification information of the first electronic device 101 to the speaker 425. Audio outputting from the first electronic device 101 is output before outputting called data from the first electronic device 101 or the second electronic device 102 or may be output together while outputting called data. Audio outputting from the first electronic device 101 is audio including a signal of a designated frequency band (e.g., an audible frequency in the range of 20 Hz-20,000 Hz). The first electronic device 101 receives information about a relative location of the first electronic device 101 and the second electronic device 102 determined based on audio output from the first electronic device 101 from the second electronic device 102. In this case, information about a location of the second electronic device 102 relative to the first electronic device 101 in which the second electronic device 102 transmits to the first electronic device 101 is information determined based on a difference of audio output from the first electronic device 101 input to each of at least two designated microphones (e.g., the third microphone 427 and the fourth microphone 429) included in the second electronic device 102.

When the first electronic device 101 and the second electronic device 102 are located, as shown in FIG. 4B, the electronic device 101 processes designated data called from the first electronic device 101 like one device with the second electronic device 102 with reference to information about a relative location received from the second electronic device 102. According to an embodiment of the present invention, designated data called from the first electronic device 101 is a movie file and includes a screen configuration image provided to display in the display and audio of two channels or more divided into left side audio and right side audio. The first electronic device 101 outputs the left side audio (e.g., a first division of data) and information corresponding to a left side designated area in a screen configuration image of a movie file to the display 150 and the first speaker 425 of the first electronic device 101, and the first electronic device 101 includes information requesting to output the right side audio (e.g., a second division of data) and information corresponding to a right side designated area of a screen configuration image of a movie file to the display 250 and the second speaker 431 of the second electronic device 102 and transmits the information to the second electronic device 102.

According to an embodiment of the present invention, when the first electronic device 101 and the second electronic device 102 share and output multimedia data, the first electronic device 101 and the second electronic device 102 insert and output designated information (e.g., identification information of the electronic device) with an audio frequency into audio of each outputting multimedia data, and the electronic device that receives the output audio determines a relative location of another electronic device based on audio and identification information included in audio. The electronic device that determines a relative location of another electronic device controls a method of outputting multimedia data while sharing and outputting with the other electronic device through network communication.

According to an embodiment of the present invention, when outputting audio of multimedia while sharing with the second electronic device 102, the first electronic device 101 includes and outputs audio information in a designated frequency domain of audio outputting identification information of the first electronic device 101. The second electronic device 102 that receives audio in which the first electronic device 101 outputs determines a relative location (e.g., the left side of the second electronic device 102) in which the first electronic device 101 is located based on the received audio and determines that an electronic device located at the left side of the second electronic device 102 based on an identification code included in audio in which the first electronic device 101 transmits is the first electronic device 101. The second electronic device 102 includes and outputs relative location information (e.g., relative location information of the first electronic device 101 determined based on the second electronic device 102) of the electronic device 101 and/or identification information of the second electronic device 102 in outputting audio (e.g., a designated frequency domain of audio of multimedia data while sharing with the first electronic device 101). Alternatively, the second electronic device 102 transmits data controlling an outputting method of multimedia while sharing between the first electronic device 101 and the second electronic device 102 according to a relative location of the second electronic device 102 and the first electronic device 101 by network communication connected to the first electronic device 101.

An embodiment of the present invention is described below with reference to FIG. 4C.

The first electronic device 101 processes (or requests) at least two other electronic devices (e.g., the second electronic device 102, the third electronic device 103, and the fourth electronic device 104) connected through network communication to output audio of a designated frequency band and acquires information about a relative location of each electronic device based on the output audio.

According to an embodiment of the present invention, the first electronic device 101 outputs designated audio (e.g., a first audio) including an instruction (or control information) requesting the second electronic device 102, the third electronic device 103, or the fourth electronic device 104 connected by network communication to output designated audio to a speaker 445. The electronic device 101 outputs designated first audio with a designated frequency band. For example, the first electronic device 101 includes and outputs an instruction requesting to output designated data through a display and a speaker of at least two other electronic devices (e.g., the second electronic device 102, the third electronic device 103, or the fourth electronic device 104) connected by network communication in a designated first frequency band. The first electronic device 101 outputs the first audio requesting to output designated audio to the second electronic device 102, and the second electronic device 102 acquires the first audio in which the first electronic device 101 outputs through a third microphone 447 and a fourth microphone 449 included in the second electronic device 102. The second electronic device 102 determines a relative location (e.g., the left side of the second electronic device 102) of the first electronic device 101 through a difference of first audio acquired through the third microphone 447 and the fourth microphone 449 and outputs designated second audio to a speaker 451 with reference to an instruction included in audio. The first audio requesting respective other electronic devices connected by network communication to output designated audio includes information requesting respective electronic devices to output audio of a designated frequency band. For example, the first audio in which the first electronic device 101 outputs includes a first instruction requesting the second electronic device 102 to output the second audio of a designated second frequency hand, includes a second instruction requesting the third electronic device 103 to output a third audio of a designated third frequency band, or includes a third instruction requesting the fourth electronic device 104 to output a fourth audio of a designated fourth frequency band. The electronic device 101 includes and outputs at least one of a first instruction, a second instruction, and a third instruction in outputting the first audio. In this case, a first frequency band constituting the first audio, a second frequency band constituting the second audio, a third frequency band constituting the third audio, or a fourth frequency band constituting the fourth audio may be at least a portion of an audible frequency (e.g., 20 Hz-20,000 Hz) band.

The first electronic device 101, the second electronic device 102, the third electronic device 103, or the fourth electronic device 104 determines relative location information with reference to audio input through at least one microphone. According to an embodiment of the present invention, it may be determined that the second electronic device 102 is located at the leftmost side (e.g., a relative left location based on the first electronic device 101, the third electronic device 103, and the fourth electronic device 104) based on the second audio, the third audio, or the fourth audio input to a first microphone 441 and a second microphone 443. It may be determined that the second electronic device 102 is located at the right side of the first electronic device 101 and the left side of the third electronic device 103 and the fourth electronic device 104 based on the first audio, the third audio, or the fourth audio input to the third microphone 447 and the fourth microphone 449. It may be determined that the third electronic device 103 is located at the right side of the first electronic device 101 and the second electronic device 102 and the left side of the fourth electronic device 104 based on the first audio, the second audio, or the fourth audio input to the fifth microphone 453 and the sixth microphone 455. It may be determined that the fourth electronic device 104 is located at the rightmost side (e.g., a relative right location based on the first electronic device 101, the second electronic device, and the third electronic device 103) based on the first audio, the second audio, or the third audio input to a seventh microphone 459 and an eighth microphone 461.

The second electronic device 102 includes and outputs determined location information in the second audio or transmits determined location information by network communication connected to the first electronic device 101 to the first electronic device 101. In a similar method, the third electronic device 103 or the fourth electronic device 104 includes and outputs location information in each audio or transmits determined location information to the first electronic device 101 connected by network communication.

The first electronic device 101 determines a relative location of each electronic device with reference to location information received from the second electronic device 102, the third electronic device 103, or the fourth electronic device 104 or location information included in second audio, third audio, or fourth audio input to the first microphone 441 and the second microphone 443. The electronic device 101 divides and outputs data (e.g., a movie file) based on relative location information of the electronic devices. According to an embodiment of the present invention, when the first electronic device 101, the second electronic device 102, the third electronic device 103, and the fourth electronic device 104 are located in the above order from the left side to the right side, in order to use a display (e.g., the display 150, the display 250, a display 350, and a display 450 from the left side to the right side) of each electronic device like one display, an area of a screen configuration image of a movie file is designated and divided, and data including a divided screen configuration is output and transmitted from a display of a corresponding electronic device. According to an embodiment of the present invention, when a movie file includes audio outputting with left and right (e.g., the left side and the right side) 2-channel stereo, the electronic device 101 processes the audio to form 2-channel stereo by enabling the first electronic device 101 to output audio of a left side 1-channel and the second electronic device 102 to output audio of a right side 1-channel.

According to an embodiment of the present invention, when outputting multimedia data (e.g., an image, a moving picture, and audio data) designated to divide a relative location and orientation of a display device or in which order is determined, at least one other electronic device connected (or sharing data) to the electronic device 101 determines a relative location of each device and the electronic device 101 outputs designated multimedia data to an electronic device satisfying a condition of a relative location.

Figure 5:
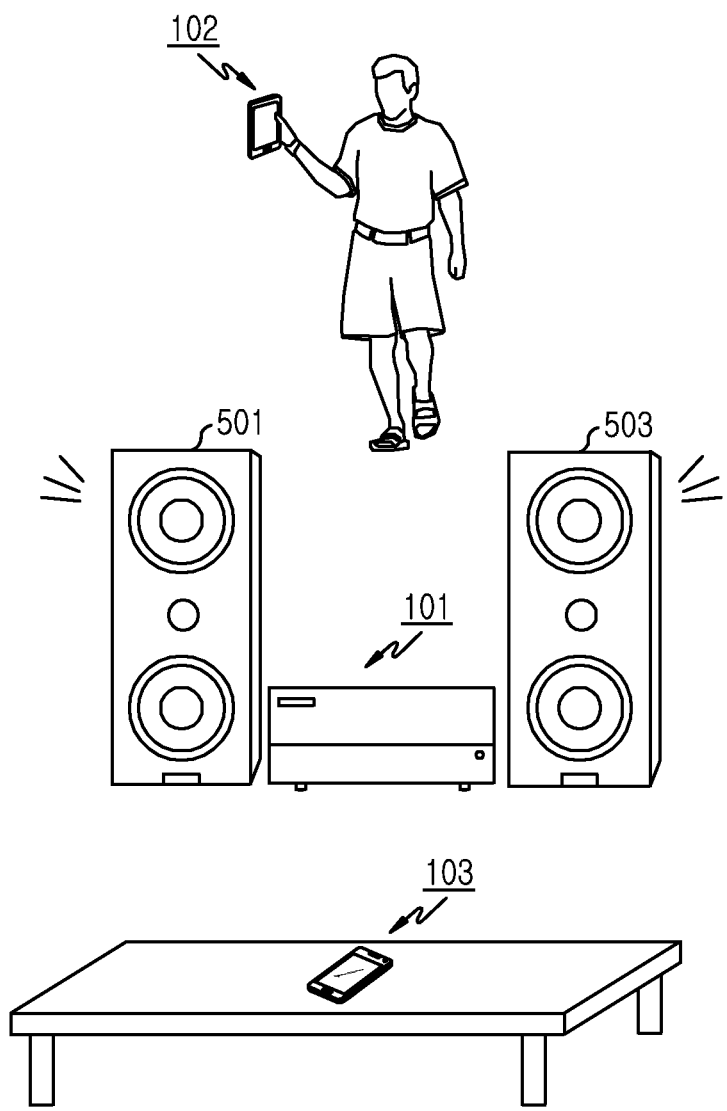
FIG. 5 is a diagram illustrating a relative location of a designated another electronic device in an electronic device according to an embodiment of the present invention.

FIG. 5 is a diagram illustrating a relative location of a designated another electronic device in the electronic device 101 according to an embodiment of the present invention.

The electronic device 101 determines location information relative to the second electronic device 102 (or the third electronic device 103) connected by network communication. The electronic device 101 changes a method of processing data according to a location of the second electronic device 102 or the third electronic device 103. According to an embodiment of the present invention, the electronic device 101 receives information requesting to reproduce a music file from the second electronic device 102 connected by network communication. The second electronic device 102 includes information requesting to reproduce a music file in audio of a designated frequency band and outputs the audio through a speaker, and the electronic device 101 inputs audio output from the second electronic device 102 through at least two microphones 180 included at a designated location internal or external to the second electronic device 102. The electronic device 101 determines a relative location of the second electronic device 102 through a difference of audio acquired through at least two microphones 180. According to an embodiment of the present invention, when a music file requests to reproduce in the second electronic device 102 is formed with left and right 2-channel stereo, the electronic device 101 outputs a requested music file with a 2-channel stereo configuration that sets a first speaker 501 to a speaker outputting audio of a right side 1-channel and sets the second speaker 503 to a speaker outputting audio of a left side 1-channel based on location information of the second electronic device 102.

As described above, the electronic device 101 determines a relative location of the third electronic device 103 based on audio outputting from the third electronic device 103 and determines the first speaker 501 of the first electronic device 101 to a left speaker and the second speaker 503 of the first electronic device 101 to a right speaker based on a location of the third electronic device 103.

FIGS. 6A to 6D are diagrams illustrating an operation of changing a service provided by the first electronic device 101 with reference to relative location information of the second electronic device 102 determined in the electronic device 101 according to an embodiment of the present invention.

When the electronic device 101 receives data requesting to call a designated program or a designated function from the second electronic device 102 connected by network communication, the electronic device 101 determines relative location information of the second electronic device 102 to the first electronic device 101 and processes the second electronic device 102 to provide contents corresponding to the determined location information. According to an embodiment of the present invention, contents corresponding to location information are contents of a menu corresponding to relative location information of the second electronic device 102 determined based on the first electronic device 101 in a program (e.g., a vehicle support program in which contents providing for a driver and contents providing for a fellow passenger are divided) in which a menu (or function) providing according to location information of the second electronic device 102 is differentiated (or divided).

An embodiment of the present invention is described with reference to FIGS. 6A and 6B.

Figure 6A:
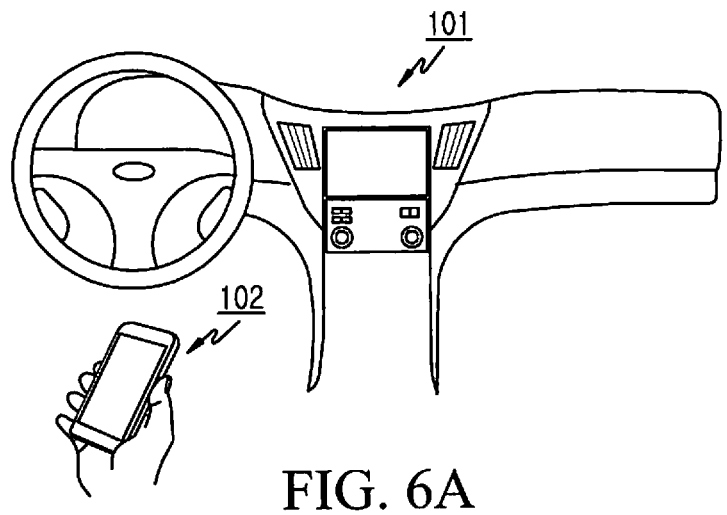
FIGS. 6A to 6D are diagrams illustrating an operation of changing a service provided by a first electronic device with reference to relative location information of a determined second electronic device in an electronic device according to an embodiment of the present invention.

Referring to FIG. 6A, the first electronic device 101 is an integrated information system included in a vehicle, and the second electronic device 102 is a smart phone connected to the first electronic device 101 by network communication. According to an embodiment of the present invention, the first electronic device 101 (e.g., an integrated information system of a vehicle) provides at least one contents that can control the vehicle. In order to provide contents controlling the vehicle, the first electronic device 101 uses at least one program (e.g., a vehicle support program). The first electronic device 101 requests the second electronic device 102 to provide contents controlling a vehicle (a vehicle including the first electronic device 101) through a program promised with the second electronic device 102. The First electronic device 101 receives data controlling to call a vehicle support program from the second electronic device 102. When transmitting data calling a vehicle support program to the first electronic device 101, the second electronic device 102 outputs audio of a designated frequency band. Audio (e.g., audio of a designated frequency band) in which the second electronic device 102 outputs is a notification message notifying that a vehicle support program of the first electronic device 101 is called. The second electronic device 102 inserts and outputs identification information of the second electronic device 102 into a designated frequency band of a notification message. The first electronic device 101 acquires audio (e.g., a notification message) in which the second electronic device 102 outputs through at least two microphones 180 included in a designated location and compares audio input through each microphone 180 and in which the second electronic device 102 outputs. For example, when the electronic device 101 acquires audio in which the second electronic device 102 outputs through a first microphone and a second microphone, the audio is used to determine a difference of times input to the first microphone and the second microphone. Alternatively, the electronic device 101 determines a phase difference of audio in which the second electronic device 102 outputs and that is input to the first microphone and the second microphone. Alternatively, the electronic device 101 determines a volume difference of audio input to the first microphone and the second microphone and in which the second electronic device 102 outputs. As described above, the electronic device 101 determines a difference of at least one component constituting audio and determines relative location information (e.g. information including a direction) of the second electronic device 102 to the first electronic device 101 based on the determined difference.

Figure 6B:
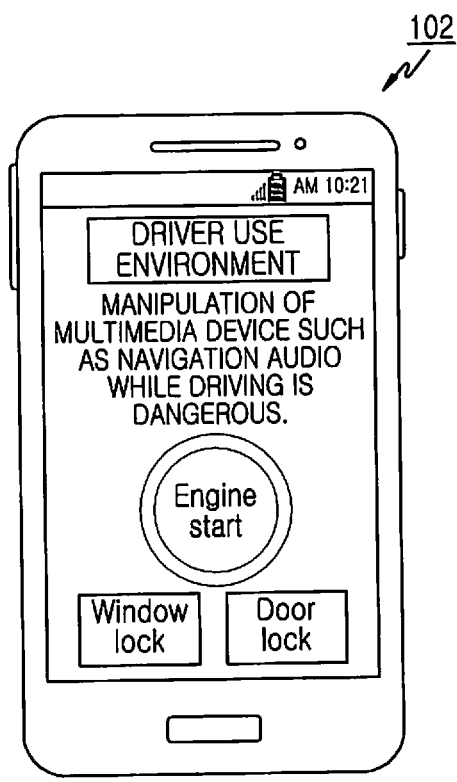

Referring to FIG. 6B, the first electronic device 101 determines that relative location information of the second electronic device 102 determined based on a location of the first electronic device 101 is located at the left side (e.g., a driver's seat direction) of the first electronic device 101. When it is determined that the second electronic device 102 is located at a driver's seat, the electronic device 101 provides (or requests to display) a list of a function or a driver menu of a vehicle support program designated to control at the driver's seat to the second electronic device 102. Alternatively, the first electronic device 101 transmits data requesting the second electronic device 102 to provide a list of a function or a driver menu of a vehicle support program designated to control at a driver's seat to the second electronic device 102. According to an embodiment of the present invention, a method in which the first electronic device 101 transmits data (e.g., control information) requesting the second electronic device 102 to provide a list of a function or a driver menu of a vehicle support program to the second electronic device 102 is a method of including and outputting requesting data in designated audio (e.g., audio of an audible frequency or a guide message).

According to an embodiment of the present invention, the second electronic device 102 displays information about a function provided in a driver environment, such as a "starting button," "window lock," or "door lock" in a display according to control information received in the first electronic device 101 and outputs designated information about the displayed function through a speaker.

An embodiment of the present invention is described with reference to FIGS. 6C and 6D.

Figure 6C:
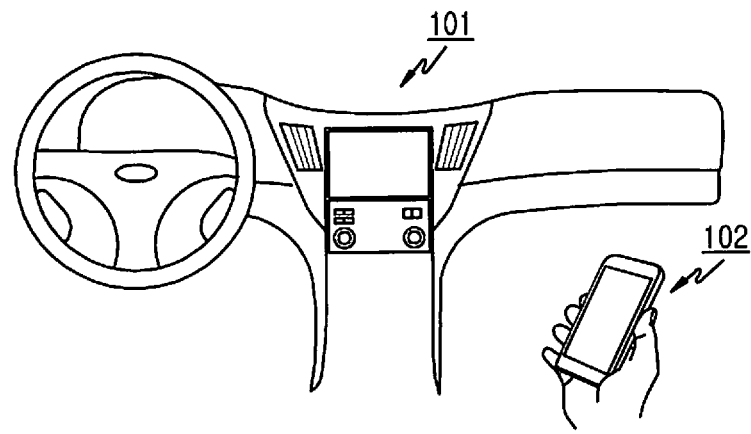

Referring to FIG. 6C, the first electronic device 101 is an integrated information system included in the vehicle, and the second electronic device 102 is a smart phone connected to the first electronic device by network communication. According to an embodiment of the present invention, the first electronic device 101 (e.g., an integrated information system of a vehicle) provides at least one content that can control the vehicle. In order to provide contents controlling the vehicle, the first electronic device 101 uses at least one program (e.g., a vehicle support program). The first electronic device 101 requests the second electronic device 102 to provide contents controlling a vehicle (e.g. a vehicle including the first electronic device 101) through a program promised with the second electronic device 102. The first electronic device 101 outputs data controlling to call a vehicle support program from the second electronic device 102. When transmitting data calling a vehicle support program to the first electronic device 101, the second electronic device 102 outputs audio of a designated frequency band. Audio (e.g., audio of a designated frequency band) in which the second electronic device 102 outputs is a notification message notifying that a vehicle support program of the first electronic device 101 is called. The second electronic device 102 inserts and outputs identification information of the second electronic device 102 into a designated frequency band of a notification message. The first electronic device 101 determines that a relative location of the second electronic device 102 is located at the right side (e.g., a passenger seat direction) based on the first electronic device 101 through audio output by the second electronic device 102.

Figure 6D:
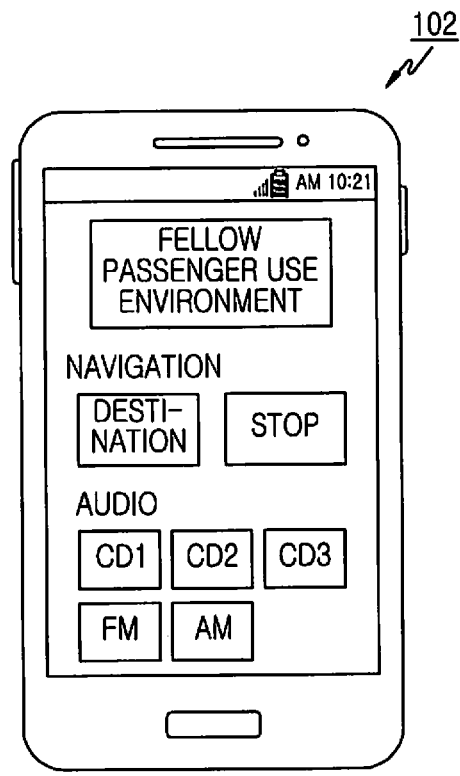

Referring to FIG. 6D, the first electronic device 101 provides a list of a function or a fellow passenger menu of a vehicle support program designated to control at a passenger seat to the second electronic device 102. Alternatively, the first electronic device 101 transmits data requesting the second electronic device 102 to provide a fellow passenger menu of a list of a function or a vehicle support program designated to control at a passenger seat to the second electronic device 102. According to an embodiment of the present invention, a method in which the first electronic device 101 transmits data (e.g., control information) requesting the second electronic device 102 to provide a list of a function or a fellow passenger menu of a vehicle support program to the second electronic device 102 is a method of including and outputting requesting data in designated audio (e.g., audio of an audible frequency).

According to an embodiment of the present invention, the second electronic device 102 displays information about a function provided in a fellow passenger environment like a "navigation control menu" or an "audio control menu" in a display and/or outputs the information to a speaker according to control information received from the first electronic device 101.

According to an embodiment of the present invention, data communication is performed based on audio between electronic devices (e.g., the first electronic device 101 and the second electronic device 102) in which network communication is not smooth based on a method in which the electronic device 101 includes designated control information in audio described with reference to FIGS. 6A and 6B and/or FIGS. 6 and 6D and transmits the audio to another electronic device.

Figure 7A:
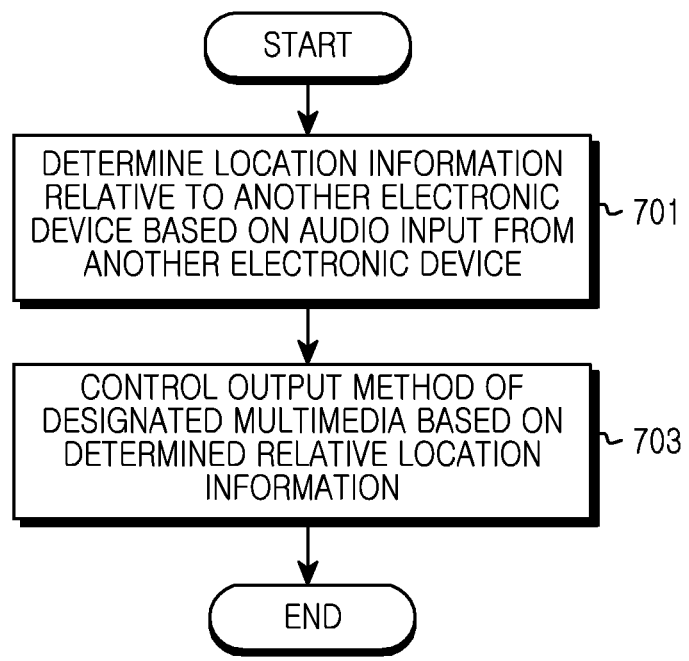
FIGS. 7A to 7C are flowcharts illustrating an operation of determining a relative location through audio and processing data according to the relative location in an electronic device according to an embodiment of the present invention.
Figure 7B:
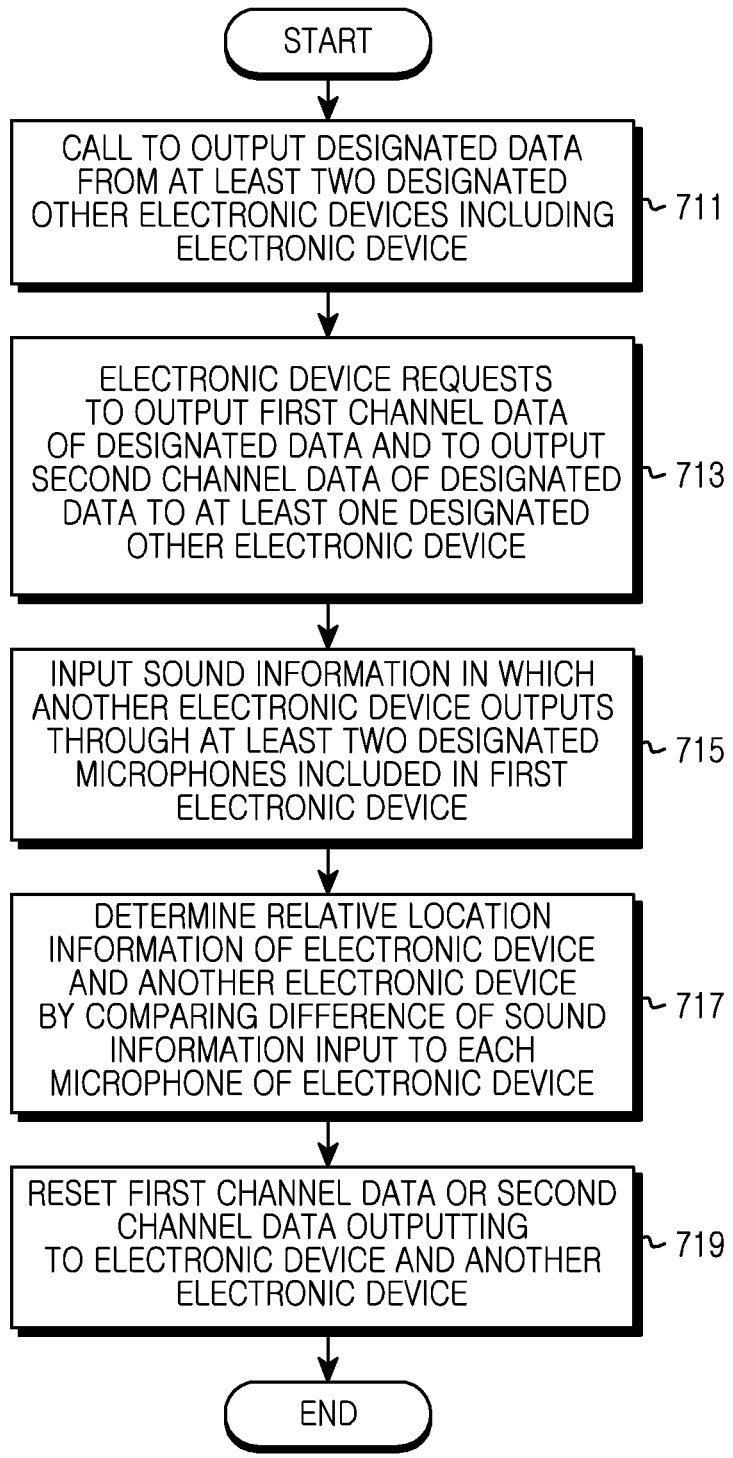
Figure 7C:
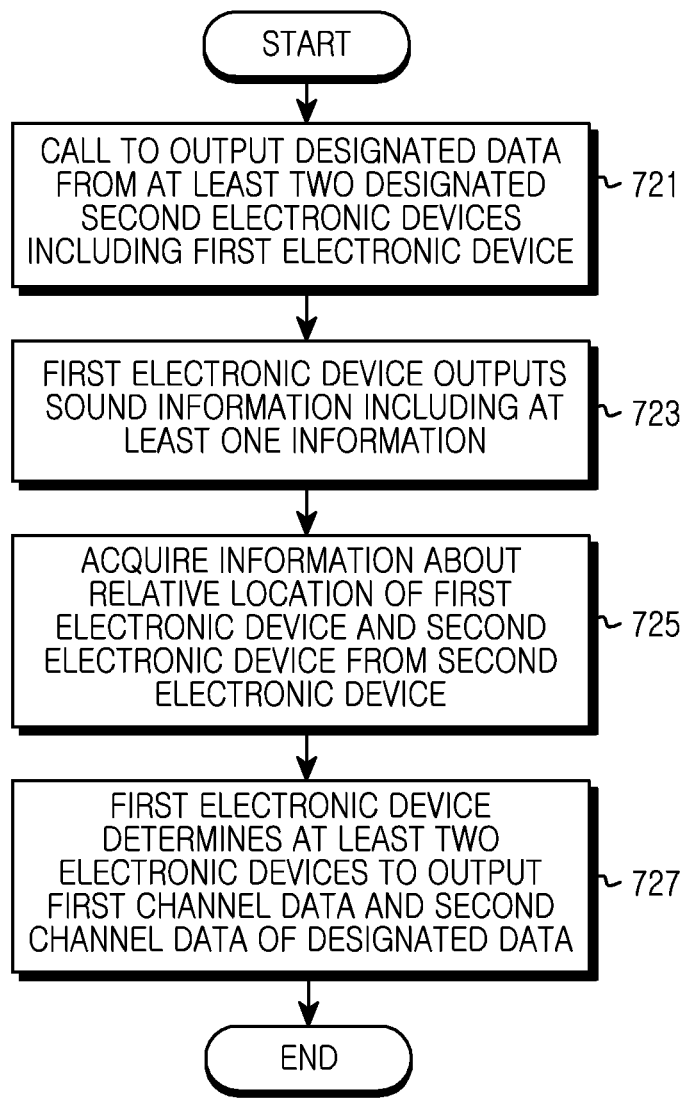

FIGS. 7A to 7C are flowcharts illustrating an operation of determining a relative location through audio and processing data according to the relative location in the electronic device 101 according to an embodiment of the present invention.

The First electronic device 101 determines relative location information of the second electronic device 102 and/or the third electronic device 103 through audio. In order to determine a direction in which audio is output based on input audio, the electronic device 101 includes at least two microphones 180 at a designated location thereof. In order to determine a direction in which audio is output by inputting audio, the second electronic device 102 and/or the third electronic device 103 described in the following description includes at least two microphones at a designated location and a configuration thereof is set to have the same configuration as or a configuration similar to that of the first electronic device 101.

An embodiment of the present invention is described below with reference to FIG. 7A.

The first electronic device 101 determines location information relative to the second electronic device 102 through audio input from at least one another electronic device (e.g., the second electronic device 102) that shares data in a sharing mode state in step 701. According to an embodiment of the present invention, audio input from the second electronic device 102 is audio data included in multimedia data included in the electronic device 101. The electronic device 101 enables the electronic device 101 and the second electronic device 102 to together output multimedia data included in the electronic device 101 through a sharing mode. The first electronic device 101 inputs audio input from the second electronic device 102 to at least two microphones (e.g., a first microphone and a second microphone) included in the electronic device 101. The first electronic device 101 acquires first audio data based on audio input to the first microphone and acquires second audio data based on audio input to the second microphone. By comparing information such as a phase difference of first audio data and second audio data corresponding to a designated segment of audio based on the acquired first audio data and second audio data, a time difference between a time point in which an input of audio to the first microphone is started and a time point in which an input of audio to the second microphone is started, first audio data, and a volume difference of first audio data, the first electronic device 101 determines relative location information (and/or relative direction information) of the second electronic device 102 that outputs audio based on a location of the first electronic device 101.

According to an embodiment of the present invention, when audio input from the second electronic device 102 includes location information relative to the first electronic device 101 determined in the second electronic device 102, the first electronic device 101 determines location information relative to the second electronic device 102 based on relative location information included in the input audio. When determining location information relative to the second electronic device 102, the first electronic device 101 inputs audio input from the first electronic device 101 to at least two microphones included in the second electronic device 102 and compares and determines audio data input to at least two microphones.

The first electronic device 101 controls an output method of multimedia data sharing in the first electronic device 101 and the second electronic device 102 based on the determined relative location information in step 703. According to an embodiment of the present invention, when sharing and outputting designated multimedia data with at least one another electronic device, the electronic device 101 separates (or divides) video data and/or audio data included in multimedia data into at least two designated channels. The electronic device 101 selects at least one multimedia data based on relative location information among multimedia data corresponding to separated at least two designated channels and to output the at least one multimedia data from the second electronic device 102.

According to an embodiment of the present invention, an output method of multimedia data in which the electronic device 101 controls is a method of controlling at least one of at least two designated menus providing in a designated program of the electronic device 101. According to an embodiment of the present invention, when the first electronic device 101 provides a vehicle control program using in a vehicle, the first electronic device 101 determines relative location information of the second electronic device 102 based on audio acquired from the second electronic device 102. The electronic device 101 provides designated another menu of a vehicle control program according to a case in which location information of the second electronic device 102 is a driver's seat or a passenger seat based on a location of the first electronic device 101.

According to an embodiment of the present invention, the first electronic device 101 includes and outputs determined relative location information in audio data of multimedia data outputting in a sharing mode and include and outputs an instruction requesting to control designated at least one function of the second electronic device 102 that receives audio.

When step 703 is performed, the first electronic device 101 terminates the embodiment of FIG. 7A.

An embodiment of the present invention is described below with reference to FIG. 7B.

The electronic device 101 (e.g., the first electronic device 101) displays a screen configuration image of a designated movie file in the display 150 according to an instruction calling designated data (e.g., a movie file) in a sharing mode and outputs audio of the designated movie file through the speaker 190 in step 711. The electronic device 101 includes and outputs instruction information including at least one instruction in audio outputting to the speaker 190. For example, the electronic device 101 includes an instruction requesting another electronic device (e.g., the second electronic device 102 or the third electronic device 103) in a sharing mode state that receives audio to output audio of a designated frequency band including identification information of a corresponding electronic device. When the electronic device 101 receives audio requested from the second electronic device 102 and/or the third electronic device 103, the electronic device 101 determines that the second electronic device 102 and/or the third electronic device 103 are/is in a sharing mode state that together reproduces a movie file reproducing in the first electronic device 101.

According to an embodiment of the present invention, the first electronic device 101 includes an instruction that enables another electronic device (e.g., the second electronic device 102 and/or the third electronic device 103) that receives audio to request a connection by network communication designated to the first electronic device 101 in audio outputting in a sharing mode state. When the second electronic device 102 and/or the third electronic device 103 in a sharing mode state receive(s) audio in which the first electronic device 101 outputs, the second electronic device 102 and/or the third electronic device 103 requests a designated network communication connection to the first electronic device 101 according to an instruction included in the audio.

According to an embodiment of the present invention, the first electronic device 101 includes information requesting another electronic device (e.g., the second electronic device 102 and/or the third electronic device 103) that receives audio to output audio of a designated frequency band in audio outputting in a sharing mode state. Further, the first electronic device 101 includes an instruction requesting each electronic device that outputs audio to include and output relative location information of at least one another electronic device in outputting audio with reference to audio input to at least two speakers. The second electronic device 102 and/or the third electronic device 103 that receive(s) audio in which the first electronic device 101 outputs audio of a frequency band according to an instruction included in audio output by the first electronic device 101 and includes and outputs identification information of each electronic device (e.g., the second electronic device 102 and/or the third electronic device 103) and/or relative location information of another electronic device based on each electronic device in the audio. The first electronic device 101 receives audio of a designated frequency band in which the second electronic device 102 and/or the third electronic device 103 outputs and determines a relative location (or a direction) of the second electronic device 102 and/or the third electronic device 103 based on the first electronic device 101.

When at least one other electronic device (e.g., the second electronic device 102 and the third electronic device 103) in a sharing mode is connected by network communication, at least two electronic devices in a sharing mode state reproduce designated data (e.g., a movie file) selected to reproduce in the electronic device 101 in step 713. According to an embodiment of the present invention, the first electronic device 101 determines that the second electronic device 102 and the third electronic device 103 are in a sharing mode together with the first electronic device 101 and are in a state in which network communication is connected. The first electronic device 101 divides designated data so that at least two electronic devices reproduce the designated data (e.g., a movie file) like an electronic device. According to an embodiment of the present invention, when the first electronic device 101 determines the second electronic device 102 and the third electronic device 103 in a sharing mode, the first electronic device 101 separates a movie file to output the movie file through a display and a speaker of the first electronic device 101, the second electronic device 102, and the third electronic device 103. For example, the electronic device 101 divides and separates a screen configuration image of the movie file into a left side area, an intermediate area, and a right side area and separates audio of the movie file based on at least one channel. The first electronic device 101 transmits the separated screen configuration image and audio to a corresponding electronic device. For example, when the first electronic device 101, the second electronic device 102, and the third electronic device 103 are arranged from the left side to the right side, the first electronic device 101 transmits divided data so as to output a left screen configuration image of the movie file from the first electronic device 101, to output an intermediate screen configuration image from the second electronic device 102, and to output a right screen configuration image from the third electronic device 103, and audio is transmitted to a designated electronic device according to a divided channel.

The first electronic device 101 determines whether a divided movie file is output from an electronic device corresponding to designated location order with reference to audio outputting from the second electronic device 102 and the third electronic device 103 outputting the divided movie file in step 715. According to an embodiment of the present invention, the first electronic device 101 transmits an instruction requesting to include and output identification information of a corresponding electronic device and/or an instruction requesting to output audio of a designated frequency band from the electronic device, having received a divided movie file at time point that transmits a divided movie file to a corresponding electronic device. Alternatively, the first electronic device 101 outputs audio requesting each electronic device while outputting a divided movie file while reproducing a movie file to output audio of a designated frequency band. In this case, audio in which the first electronic device 101 outputs and/or audio in which another electronic device outputs may be audio of an audible frequency band or when audio of a designated channel of a movie file is output, the audio may be included and output in audio of a designated channel of the movie file. The first electronic device 101 inputs audio in which the second electronic device 102 and/or the third electronic device 103 outputs through at least two microphones included in the first electronic device 101.

The first electronic device 101 compares a difference of audio input through at least two microphones included at a designated location and outputs from the second electronic device 102 and/or the third electronic device 103 and determines an output direction of the input audio in step 717. Further, the first electronic device 101 acquires relative location information of other electronic devices included in audio output by the second electronic device 102 and/or the third electronic device 103 and determines a relative location of the second electronic device 102 and the third electronic device 103 based on the first electronic device 101. The first electronic device 101 performs step 717 at every designated time interval, and when an instruction to perform step 717 is input to the first electronic device 101, the first electronic device 101 performs the instruction.

The electronic device 101 determines whether division data of a designated movie file is output from a designated electronic device according to a determined relative location of the second electronic device 102 and the third electronic device 103 in step 719. According to an embodiment of the present invention, the first electronic device 101 detects that a relative location of the second electronic device 102 and/or the third electronic device 103 is changed based on the first electronic device 101 while transmitting a divided movie file to output a left side area of a movie file from the first electronic device 101, to output an intermediate area thereof from the second electronic device 102, and to output a right side area thereof from the third electronic device 103 according to a relative location (e.g., order of the first electronic device 101, the second electronic device 102, and the third electronic device 103 from the left side to the right side) of the second electronic device 102 and the third electronic device 103 determined in step 713. For example, when it is detected that the second electronic device 102 is located at the left side of the first electronic device 101, the first electronic device 101 transmits a left side area of a movie file to the second electronic device 102 so that the second electronic device 102 outputs the left side area of a movie file, having been output from the first electronic device 101, the first electronic device 101 outputs an intermediate area of the movie file, and the first electronic device 101 transmits the right side area of the movie file so that the third electronic device 103 outputs the right side area of the movie file. The first electronic device 101 transmits audio of the movie file so as to output audio of a corresponding channel according to designated order.

When step 719 is performed, the first electronic device 101 terminates the embodiment of FIG. 7B.

An embodiment of the present invention is described below with reference to FIG. 7C.

The first electronic device 101 detects an instruction calling designated data (e.g., a movie file) in a sharing mode in step 721. Here, a sharing mode is a mode of using at least two electronic devices by interlocking like one electronic device when outputting one designated data (e.g., data including information that can output through a display or a speaker like a movie file and an audio file).

The first electronic device 101 outputs audio including a designated instruction to at least one electronic device while operating in a sharing mode in step 723. According to an embodiment of the present invention, the first electronic device 101 outputs audio including an instruction requesting at least one another electronic device (e.g., the second electronic device 102 and/or the third electronic device 103) in a sharing mode state to output audio of a designated frequency band through the speaker 190 of the first electronic device 101.

The first electronic device 101 inputs audio in which the second electronic device 102 outputs through at least two speakers included at a designated location of the electronic device 101 in step 725. According to an embodiment of the present invention, audio in which the second electronic device 102 outputs is audio that includes and outputs identification information of the second electronic device 102 and/or relative location information of the first electronic device 101 or the third electronic device 103 determined based on audio in which another electronic device (e.g., the first electronic device 101 or a corresponding third electronic device when a third electronic device that outputs audio exists) outputs in audio of a designated frequency band according to an instruction included in audio output by the first electronic device 101.

The first electronic device 101 determines at least one other electronic device in a sharing mode state through acquired audio and determines a relative location of each of the other electronic devices based on a location of the first electronic device 101 in step 727. The First electronic device 101 divides designated data determined in the first electronic device 101 to output from at least two electronic devices in a sharing mode state according to the number of other electronic devices determined to a sharing mode state and transmits divided data according to a relative location of the second electronic device 102 (and/or the third electronic device 103 when the third electronic device 103 is connected in a sharing mode) determined based on a location of the first electronic device 101. According to an embodiment of the present invention, when forming a sharing mode through the first electronic device 101 and the second electronic device 102 and outputting a movie file, the first electronic device 101 divides a screen configuration image of the movie file into a left side image and a right side image and enables each of displays of the first electronic device 101 and the second electronic device 102 to output the divided left screen configuration image of the movie file and the divided right screen configuration image of the movie file. In order to output the divided screen configuration image of the movie file to one display, the electronic device 101 determines a disposition state (e.g., relative location information of the first electronic device 101 and the second electronic device 102) of the first electronic device 101 and the second electronic device 102 in a sharing mode. The first electronic device 101 divides audio included in the movie file on a channel basis constituting audio, similarly to a screen configuration image and enables the output of audio from at least one designated electronic device.

When step 727 is performed, the first electronic device 101 terminates the embodiment of FIG. 7C.

Figure 8A:
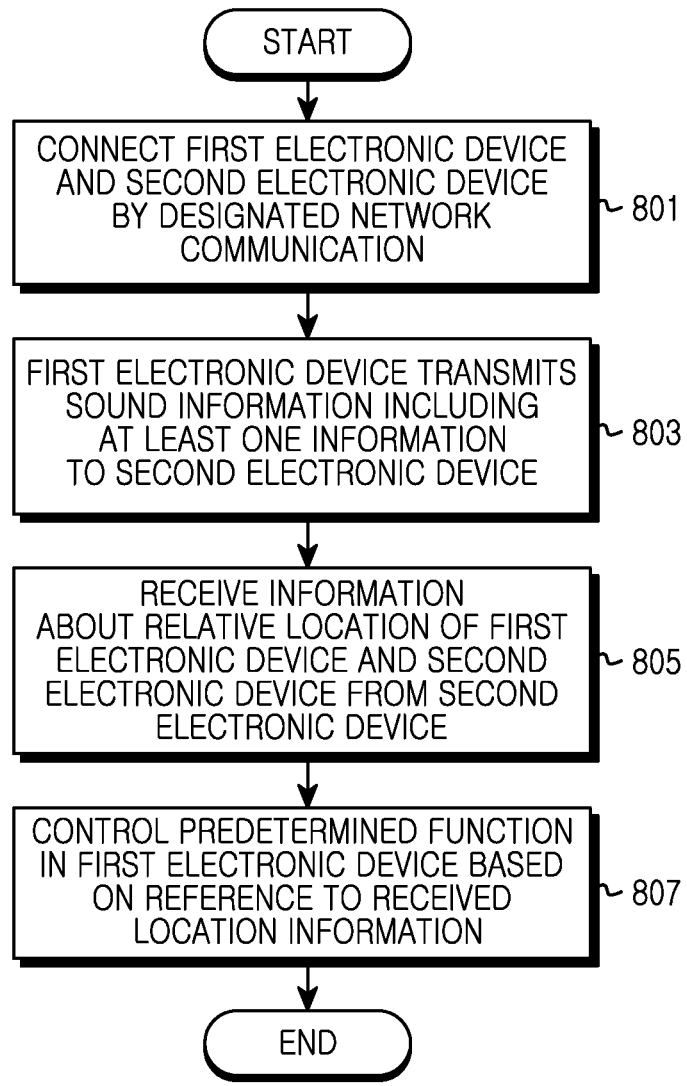
FIGS. 8A and 8B are flowcharts illustrating operation of determining a relative location through audio and processing data according to the relative location in an electronic device according to an embodiment of the present invention.
Figure 8B:
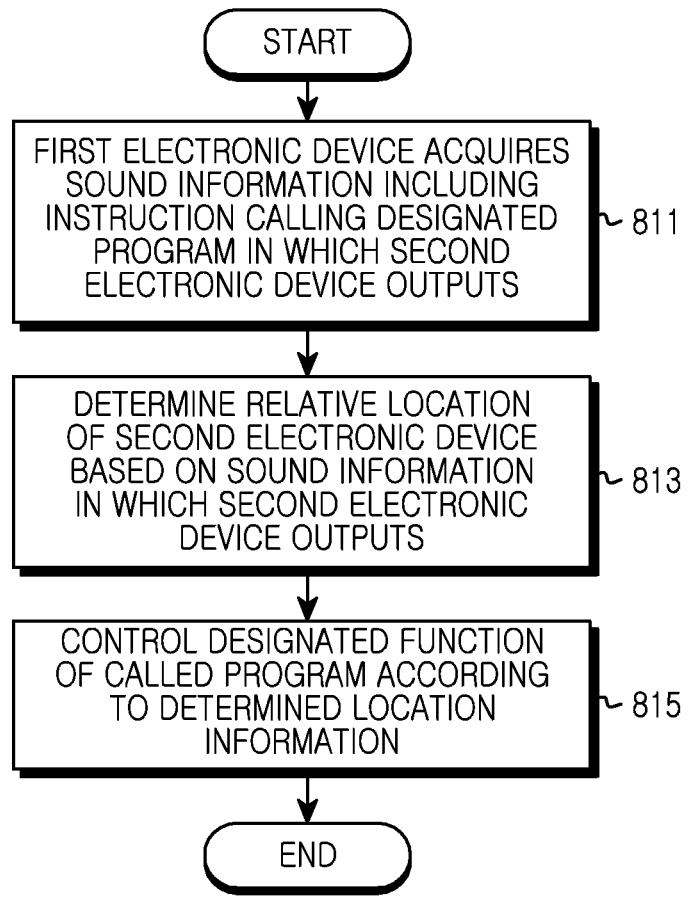

FIGS. 8A and 8B are flowcharts illustrating an operation of determining a relative location and processing data according to the relative location through audio in the electronic device 101 according to an embodiment of the present invention.

An embodiments of the present invention is described below with reference to FIG. 8A.

The first electronic device 101 is connected to the designated second electronic device 102 by network communication in step 801. The electronic device 101 forms a network communication environment with the second electronic device 102 according to a designated network communication connection request transmitted from the second electronic device 102. Further, the first electronic device 101 receives information requesting to provide a designated program from the second electronic device 102 connected by network communication.

The first electronic device 101 transits designated audio to the second electronic device 102 connected by network communication in step 803. According to an embodiment of the present invention, when transmitting audio to the second electronic device 102, the first electronic device 101 uses a method of outputting the designated audio to a speaker. The first electronic device 101 includes and transmits at least one instruction in outputting audio. For example, the first electronic device 101 outputs audio including an instruction requesting to include and output identification information of the electronic device that receives output audio in audio of a designated frequency band. Further, the first electronic device 101 includes information requesting the second electronic device 102 that receives output audio to output audio including relative location information of the first electronic device 101 determined based on the second electronic device 102 in audio outputting based on audio in which the first electronic device 101 outputs.

The first electronic device 101 receives relative location information of the first electronic device 101 determined based on the second electronic device 102 from the second electronic device 102 in step 805. The first electronic device 101 acquires location information of the second electronic device 102 through data that receives from the second electronic device 102 or receives audio in which the second electronic device 102 outputs through at least two microphones included in the first electronic device 101 and determines relative location information of the second electronic device 102 through a compared result of a difference between audio acquired with at least two microphones.

The first electronic device 101 controls a function provided in the second electronic device 102 according to location information of the second electronic device 102 determined based on the first electronic device 101 in step 807. According to an embodiment of the present invention, when a relative location of the second electronic device 102 is located at the left side or the right side based on the first electronic device 101, the first electronic device 101 requests to provide a designated other function to the second electronic device 102.

When step 807 is performed, the first electronic device 101 terminates the embodiment of FIG. 8A.

An embodiment of the present invention is described below with reference to FIG. 8B.

The first electronic device 101 receives audio in which the second electronic device 102 outputs and acquires at least one instruction included in audio in step 811. According to an embodiment of the present invention, the first electronic device 101 acquires an instruction calling a designated program from the second electronic device 102 through audio in which the second electronic device 102 outputs. The second electronic device 102 includes and outputs an instruction calling a designated program in audio of a designated frequency range promised with the first electronic device 101, and the first electronic device 101 acquires audio in which the second electronic device 102 outputs through at least two microphones 180 included in a designated location of the first electronic device 101.

The first electronic device 101 acquires audio output from the second electronic device 102 as first audio and second audio through a microphone included in at least two designated locations in step 813. The first electronic device 101 determines a relative location or a direction in which the second electronic device 102 outputs audio based on a location of the first electronic device 101 with reference to first audio and second audio. For example, the first electronic device 101 detects a difference of information such as a time difference in which first audio and second audio are input to respective microphones, a volume difference of first audio and second audio and/or a phase difference of a frequency forming a designated same segment of first audio and second audio based on first audio and second audio and determines a relative location of the second electronic device 102 or a direction in which audio is output through the detected difference.

The first electronic device 101 controls a function of a program called in the second electronic device 102 according to determined location information of the second electronic device 102 in step 815. According to an embodiment of the present invention, when a relative location of the second electronic device 101 is located at the left side or the right side based on the first electronic, device 101, the first electronic device 101 requests to provide designated another function to the second electronic device 102.

When step 817 is performed, the first electronic device 101 terminates the embodiment of FIG. 8B.

According to an embodiment of the present invention, a method of processing multimedia of an electronic device includes determining location information relative to at least one another electronic device based on audio input from the other electronic device in a mode of sharing the multimedia; and controlling an output method of the multimedia based on the relative location information.

According to an embodiment of the present invention, the input audio further includes inputting to at least two microphones mounted in the electronic device. According to an embodiment of the present invention, the at least two microphones is mounted apart a distance or more designated to determine a direction in which the input audio is output. According to an embodiment of the present invention, the relative location information is used to compare and determine data of the audio input to at least two microphones included in the electronic device. According to an embodiment of the present invention, the relative location information is used to compare and determine at least one of a volume difference of each data of the audio input to at least two microphones included in the electronic device, a phase difference at a designated segment, and a time difference in which an input of audio is started. According to an embodiment of the present invention, controlling the output method includes separating the multimedia into at least two channels and enabling another electronic device to output at least one channel. According to an embodiment of the present invention, the multimedia includes at least one of image data, video data, and audio data. According to an embodiment of the present invention, controlling the output method includes calling a designated program based on an instruction included in the input audio. According to an embodiment of the present invention, controlling the output method includes selecting and executing at least one of at least two menus in which the program provides based on at least one of the determined relative location information and the instruction. According to an embodiment of the present invention, audio output by the control includes a signal of a designated frequency band in a mode of sharing the multimedia. According to an embodiment of the present invention, audio output includes the relative location information. According to an embodiment of the present invention, audio output includes at least one instruction of the electronic device. According to an embodiment of the present invention, audio output includes an instruction requesting a connection to the other electronic device by designated network communication.

According to an embodiment of the present invention, a method of processing multimedia of a first electronic device includes entering a mode of sharing multimedia, wherein a second electronic device is in a mode state of sharing the multimedia with the first electronic device, inputting audio in which the second electronic device outputs to a first microphone and a second microphone of the first electronic device, wherein the first microphone and the second microphone are mounted apart a designated distance or more, wherein the audio includes at least one instruction of the second electronic device, comparing first audio data of the audio acquired with the first microphone and second audio data of the audio acquired with the second microphone, determining location information relative to the first electronic device of the second electronic device based on a comparison result of the first audio data and the second audio data, and controlling multimedia based on the instruction of the second electronic device included in the audio.

According to an embodiment of the present invention, comparing first audio data includes comparing at least one of a volume difference of the first audio data and the second audio data, a phase difference of a designated segment of the first audio data and the second audio data, and a difference between a time in which an input of the audio to the first microphone is started and a time in which an input of the audio to the second microphone is started. According to an embodiment of the present invention, the first microphone and the second microphone are mounted at a designated location of the first electronic device in order to determine a direction in which audio is output using the first audio data and the second audio data. According to an embodiment of the present invention, the electronic device further includes at least one microphone at a designated location of the first electronic device and determines a direction in which audio is output by interlocking with the first microphone and the second microphone. According to an embodiment of the present invention, the audio includes an instruction in which the first electronic device requests a connection to the second electronic device by designated network communication. According to an embodiment of the present invention, the audio includes a signal of a designated frequency band in a mode of sharing the multimedia. According to an embodiment of the present invention, the method further includes including and outputting the relative location information in the audio. According to an embodiment of the present invention, the instruction calls a designated program. According to an embodiment of the present invention, controlling the multimedia is selecting and executing at least one of at least two menus in which the program provides according to the determined relative location information.

According to an embodiment of the present invention, a method of processing multimedia of an electronic device includes an operation in which a first electronic device and a second electronic device enter in a mode of sharing multimedia, an operation in which the first electronic device inputs audio in which the second electronic device outputs, wherein the operation uses a first microphone and a second microphone of the first electronic device, and the first microphone and the second microphone are mounted apart a predetermined distance or more from the first electronic device, an operation in which the first electronic, device compares first audio data of audio acquired with the first microphone and second audio data of audio acquired with the second microphone and an operation in which the first electronic device determines relative location information of the second electronic device to the first electronic device based on a comparison result of the first audio data and the second audio data, wherein the first electronic device include the location information and at least one instruction in the audio.

According to an embodiment of the present invention, an electronic device determines relative location information of another electronic device that outputs audio through audio input to at least two microphones mounted at a designated location, thereby determining to output designated data such as audio and image information to correspond to a relative location of each electronic device in a mode state that uses at least two electronic devices like one electronic device and providing a differentiated service based on a relative location of at least two electronic devices.

An embodiment of the present invention may be performed by at least one program in which a memory of the electronic device 101 includes, at least one processor (e.g., the processor 120), and the data processing module 170.

According to an embodiment of the present invention, at least a portion of a device and as method according to the present invention described in claims and/or a specification of the present invention may be implemented in a form (e.g., a module) including hardware, software, firmware, or a combination of at least two of hardware, software, and firmware. A module is a minimum unit of an integrally formed component or a portion thereof and may be a minimum unit that performs an embodiment of the present invention or a portion thereof. The "module" may be mechanically or electronically implemented. When implementing with software, a non-transitory computer readable storage medium that stores at least one program (or a programming module) may be provided. For example, software may be implemented with an instruction stored in a non-transitory computer readable storage medium in a form of a programming module. At least one program may include an instruction that enables the electronic device to execute methods according to an embodiment of the present invention described in claims and/or a specification of the present invention. When the instruction is executed by at least one processor (e.g., the processor 120), the at least one processor perform a function corresponding to the instruction. The non-transitory computer readable storage media may be, for example, the memory 130. At least a portion of the programming module may be implemented (e.g., executed) by, for example, the processor 120. At least a portion of the programming module may include, for example, a module, a program, a routine, a set of instructions, or a process for performing at least one function.

The non-transitory computer readable storage media may include magnetic media such as a hard disk, a floppy disk, and a magnetic tape, optical media such as a Compact Disc Read Only memory (CD-ROM) and a Digital Versatile Disc (DVD), magneto-optical media such as a floptical disk, and a hardware device, an Electrically Erasable and Programmable Read Only memory (EEPROM), a magnetic disk storage device, or optical storage devices of other forms, and a magnetic cassette, specially formed to store and perform a program instruction (e.g., a programming module), such as a Read Only Memory (ROM), a Random Access memory (RAM), and a flash memory. Alternatively, the program may be stored at a memory formed with a combination of a portion or the entire thereof. Further, each constituent memory may be included in plural.

Further, the program may be stored at an attachable storage device that may access the electronic device through a communication network such as the Internet, the Intranet, a Local Area Network (LAN), a Wireless LAN (WLAN), a Storage Area Network (SAN), or a communication network formed with a combination thereof. Such a storage device may access the electronic device through an external port. Further, a separate storage device on the communication network may access a portable electronic device. In order to perform an operation of an embodiment of the present invention, the above-described hardware device may be formed to operate as at least one software module, and vice versa.

A module or a programming module according to an embodiment of the present invention may include at least one of the foregoing elements, may omit some elements, or may further include additional other elements. Operations performed by a module, a programming module, or another element according to an embodiment of the present invention may be executed with a sequential, parallel, repeated, or heuristic method. Further, some operations may be executed in different orders, may be omitted, or may add other operations.

While the present invention has been shown and described with reference to certain embodiments thereof, it will be understood by those skilled in the art that various changes in form and details may be made therein without departing from the scope and spirit of the present invention as defined by the appended claims and their equivalents.

What is claimed is:

1. A method of processing multimedia of an electronic device, the method comprising:
   identifying another electronic device that outputs an input audio by extracting device identification information of the another electronic device from the input audio;
   determining location information relative to the another electronic device based on the input audio from the another electronic device in a mode of sharing the multimedia; and
   controlling an output method of the multimedia based on the location information relative to the another electronic device,
   wherein the input audio is inputted through at least one microphone included in the electronic device.

2. The method of claim 1, wherein the location information relative to the another electronic device is information about a direction at which the another electronic device is located based on a location of the electronic device.

3. The method of claim 1, wherein determining the location information relative to the another electronic device comprises determining the location information relative to the another electronic device by comparing data of the audio input to at least two microphones included in the electronic device.

4. The method of claim 3, wherein determining the location information relative to the another electronic device comprises determining the location information relative to the another electronic device by comparing at least one of a volume difference and a phase difference of each of the audio input to at least two microphones included in the electronic device and a time difference in which an input is started.

5. The method of claim 1, wherein controlling the output method comprises separating the multimedia into at least two channels and processing the another electronic device to output at least one channel.

6. The method of claim 1, wherein controlling the output method comprises determining contents of the multimedia outputting from the another electronic device based on the location information relative to the another electronic device and processing the another electronic device to output the contents.

7. The method of claim 1, further comprising including and outputting the location information relative to the another electronic device in audio of the multimedia.

8. The method of claim 7, wherein the location information relative to the another electronic device is output with a frequency signal of audio of the multimedia.

9. The method of claim 1, further comprising including and outputting control information for controlling the another electronic device in audio of the multimedia.

10. An electronic device, comprising:
    a memory configured to store at least one input audio;
    at least one microphone configured to input the at least one input audio; and
    at least one processor configured to:
       identify at least one another electronic device that outputs the at least one input audio by extracting device identification information of the at least one another electronic device from the at least one input audio, determine location information relative to the at least one another electronic device based on the at least one input audio from the at least one another electronic device in a mode of sharing the multimedia, and control an output method of the multimedia based on the location information of the at least one another electronic device.

11. The electronic device of claim 10, wherein the processor is further configured to determine information about a direction at which the at least one another electronic device is located to the location information relative to the all east one another electronic device based on a location of the electronic device.

12. The electronic device of claim 10, wherein the processor is further configured to compare data of the at least one input audio input to at least two microphones included in the electronic device to determine the location information relative to the at least one another electronic device.

13. The electronic device of claim 12, wherein the processor is further configured to compare at least one of a volume difference and a phase difference of each of the at least one input audio input to at least two microphones included in the electronic device and a time difference in which an input is started to determine the location information relative to the at least one another electronic device.

14. The electronic device of claim 10, wherein the processor is further configured to separate the multimedia into at least two channels and enable the at least one another electronic device to output at least one channel.

15. The electronic device of claim 10, wherein the processor is further configured to determine contents of the multimedia outputting from the at least one another electronic device based on the location information relative to the at least one another electronic device and process the at least one another electronic device to output the contents.

16. The electronic device of claim 10, wherein the processor is further configured to output the location information relative to the at least one another electronic device in the at least one input audio of the multimedia.

17. The electronic device of claim 16, wherein the processor is further configured to output the location information relative to the at least one another electronic device as a frequency signal of at least one input audio of the multimedia.

18. The electronic device of claim 10, wherein the processor is further configured to output control information for controlling the at least one another electronic device in the at least one input audio of the multimedia.

* * * * *